(12) United States Patent
Brown et al.

(10) Patent No.: US 11,689,303 B2
(45) Date of Patent: Jun. 27, 2023

(54) GENERATING UNIFIED METADATA FOR A PLURALITY OF DISTRIBUTION PLATFORMS

(71) Applicant: Turner Broadcasting System, Inc., Atlanta, GA (US)

(72) Inventors: Cherilyn Brown, Lithia Springs, GA (US); Ronald McGuire, Peachtree Corners, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 132 days.

(21) Appl. No.: 16/671,826

(22) Filed: Nov. 1, 2019

(65) Prior Publication Data
US 2021/0135772 A1 May 6, 2021

(51) Int. Cl.
*H04H 60/73* (2008.01)
*H04N 21/8358* (2011.01)
*H04N 21/845* (2011.01)
*H04N 21/84* (2011.01)

(52) U.S. Cl.
CPC ........ *H04H 60/73* (2013.01); *H04N 21/8358* (2013.01); *H04N 21/84* (2013.01); *H04N 21/845* (2013.01)

(58) Field of Classification Search
CPC ... H04H 60/73; H04N 21/8358; H04N 21/845
USPC .......................................................... 725/32
See application file for complete search history.

(56) References Cited

U.S. PATENT DOCUMENTS

| | | | |
|---|---|---|---|
| 2004/0154039 A1* | 8/2004 | Simms | H04N 21/235 707/999.102 |
| 2013/0254041 A1* | 9/2013 | Sherwin | G06Q 30/02 705/14.68 |
| 2019/0122659 A1* | 4/2019 | Miller | G06F 3/04847 |
| 2020/0204279 A1* | 6/2020 | Lykes | H04H 60/31 |
| 2021/0136458 A1* | 5/2021 | Carney | H04N 21/47202 |

OTHER PUBLICATIONS

SMPTE, SMPTE Standard Interoperable Master Format—Essence Component, SMPTE ST 2067-5:2013 (hereafter SMPTE Standard), Feb. 21, 2013, p. 1-14 (Year: 2013).*
TVTechnology, AMWA Ratifies MXF Versioning Specification, Nov. 16, 2011, p. 1-7. (Year: 2011).*

* cited by examiner

*Primary Examiner* — Alfonso Castro
(74) *Attorney, Agent, or Firm* — Chip Law Group

(57) ABSTRACT

Provided are a system and method for generating unified metadata for a plurality of distribution platforms. One or more processors in a broadcast provider system receive a linear media feed from a source device, and based on one or more inbound triggers associated with the received linear media feed, determines a plurality of segments of the received linear media feed. A unified metadata file comprising a universal schema of a plurality of category nodes and attributes for a plurality of distribution platforms is generated based on at least a programming schedule of the received linear media feed and an asset distribution interface (ADI) specification required by each of the plurality of distribution platforms. Further, a unified package is generated comprising the plurality of segments of the linear media feed as a broadcast media feed and the unified metadata file, and transmitted to the plurality of distribution platforms via a communication network.

23 Claims, 10 Drawing Sheets

| LMd | DP1 Section | DP1 STB Field | DP2 Order | DP2 Section | DP2 STB Field | DP3 Order | DP3 Section | DP3 STB Field | DP4 Order | DP4 Section | DP4 STB Field | Order | Section | UNIFIED FIELDS Field |
|---|---|---|---|---|---|---|---|---|---|---|---|---|---|---|
| 1 | package | Metadata_Spec_Version | 1 | package | Metadata_Spec_Version | 1 | package | Metadata_Spec_Version | 1 | package | Metadata_Spec_Version | 1 | package | Metadata_Spec_Version |
| 2 |  |  |  |  |  |  |  |  |  | package | Provider_Content_Tier | 2 | package | Provider_Content_Tier |
| 3 |  |  |  |  |  |  |  |  |  |  |  |  |  |  |
| 4 | title | Actors | 15 |  |  |  | title | Actors | 14 | title | Actors | 11 | title | Actors |
| 5 | title | Actors_Display | 14 |  |  |  | title | Actors_Display | 13 | title | Actors_Display | 10 | title | Actors_Display |
| 6 | title | Ad_Content_ID | 22 | title | Ad_Content_ID | 25 | title | Ad_Content_ID | 31 | title | Ad_Content_ID | 16 | title | Ad_Content_ID |
| 7 | title | Advisories | 9 | title | Advisories | 8 | title | Advisories | 11 | title |  |  | title | Advisories |
| 8 | title | Advisories | 10 |  |  |  |  |  |  |  |  |  | title | Advisories |
| 9 | title | Advisories | 11 |  |  |  |  |  |  |  |  |  | title | Advisories |
| 10 | title | Billing_ID | 21 |  |  |  | title | Billing_ID | 17 | title | Billing_ID | 15 | title | Billing_ID |
| 11 | title | Box_Office | 32 |  |  |  |  |  |  | title | Box_Office | 24 | title | Box_Office |
| 12 | title | Category | 16 |  |  |  | title | Category | 15 | title | Category | 12 | title | Category |
| 13 | title |  |  |  |  |  | title |  |  | title | Category | 13 | title | Category |
| 14 | title | Closed_Captioning | 28 |  |  |  | title | Closed_Captioning | 21 | title | Closed_Captioning | 26 | title | Closed_Captioning |
| 15 |  |  |  |  |  |  | title | ComscoreID | 35 |  |  |  | title | ComscoreID |
| 16 |  |  |  |  |  |  |  |  |  | title | Content_Labels | 8 | title | Content_Labels |
| 17 |  |  |  |  |  |  | title | Content_Type | 4 |  |  |  | title | Content_Type |
| 18 | title | Contract_Name | 12 |  |  |  |  |  |  |  |  |  | title | Contract_Name |
| 19 |  |  |  | title | Country_of_Origin | 9 |  |  |  |  |  |  | title | Country_of_Origin |
| 20 |  |  |  |  |  |  | title | Cue_Points | 36 |  |  |  | title | Cue_Points |
| 21 | title | Display_Run_Time | 2 |  |  |  | title | Display_Run_Time | 1 | title | Display_Run_Time | 1 | title | Display_Run_Time |
| 22 |  |  |  |  |  |  | title | Episode_ID | 26 |  |  |  | title | Episode_ID |
| 23 |  |  |  |  |  |  |  |  |  |  |  |  |  |  |
| 24 |  |  |  |  |  |  |  |  |  |  |  |  |  |  |
| 25 |  |  |  | title | Episode_Name | 3 | title | Episode_Name | 25 | title | Episode_Name | 30 | title | Episode_Name |
| 26 |  |  |  | title | Episode_Number | 20 |  |  |  | title | Episode_Number | 31 | title | Episode_Number |
| 27 | title | Genre | 17 | title | Genre | 11 | title | Genre | 16 | title | Genre | 14 | title | Genre |
| 28 | title | Guide_Category | 20 |  |  |  |  |  |  |  |  |  | title | Guide_Category |
| 29 |  |  |  | title | Keywords | 21 |  |  |  |  |  |  | title | Keywords |
| 30 | title | Licensing_Window_End | 25 | title | Licensing_Window_End | 14 | title | Licensing_Window_End | 19 | title | Licensing_Window_End | 19 | title | Licensing_Window_End |
| 31 | title | Licensing_Window_Start | 24 | title | Licensing_Window_Start | 13 | title | Licensing_Window_Start | 18 | title | Licensing_Window_Start | 18 | title | Licensing_Window_Start |
| 32 |  |  |  | title | Metadata_Language | 24 |  |  |  |  |  |  | title | Metadata_Language |

FIG. 3A

| Line No | DP1 STB Section | DP1 STB Field | DP2 Order | DP2 Section | DP2 STB Field | DP3 Order | DP3 Section | DP3 STB Field | DP4 Order | DP4 Section | DP4 STB Field | UNIFIED FIELDS Order | UNIFIED FIELDS Section | UNIFIED FIELDS Field |
|---|---|---|---|---|---|---|---|---|---|---|---|---|---|---|
| 33 | | | | title | MSORating | 7 | title | | | | | | title | MSORating |
| 34 | | | | | | | title | NielsenCensusCategoryID | 34 | | | | title | NielsenCensusCategoryID |
| 35 | | | | | | | title | NielsenClientID | 32 | | | | title | NielsenClientID |
| 36 | | | | | | | title | NielsenVideoCensus | 33 | | | | title | NielsenVideoCensus |
| 37 | | | | | | | title | Original_Air_Date | 27 | | | | title | Original_Air_Date |
| 38 | | | | title | Original_Premiere_Date | 23 | | | | | | | title | Original_Premiere_Date |
| 39 | title | Preview_Period | 26 | | | | | | | title | Preview_Period | 21 | title | Preview_Period |
| 40 | title | Program_Type | 19 | | | | | | | | | | title | Program_Type |
| 41 | | | | title | Programming_Type | 22 | | | | | | | title | Programming_Type |
| 42 | title | Provider_QA_Contact | 27 | title | Provider_QA_Contact | 15 | title | Provider_QA_Contact | 20 | title | Provider_QA_Contact | 25 | title | Provider_QA_Contact |
| 43 | title | Rating | 8 | title | Rating | 6 | title | Rating | 10 | title | Rating | 7 | title | Rating |
| 44 | title | Run_Time | 3 | title | Run_Time | | title | Run_Time | 2 | title | Run_Time | 2 | title | Run_Time |
| 45 | | | | title | Season_Number | 19 | title | Season_Number | 24 | title | Season_Number | 29 | title | Season_Number |
| 46 | | | | title | Series_Description | 18 | | | | | | | title | Series_Description |
| 47 | | | | title | Series_Name | | title | Series_Name | 23 | title | Series_Name | 28 | title | Series_Name |
| 48 | title | Service_Category | 18 | | | | | | | | | | title | Service_Category |
| 49 | | | | title | Show_Type | 12 | title | Show_Type | 28 | title | Show_Type | 27 | title | Show_Type |
| 50 | | | | title | Studio | 10 | title | Studio | 22 | | | | title | Studio |
| 51 | title | Suggested_Price | 29 | | | | title | Summary_Long | | title | Suggested_Price | 20 | title | Suggested_Price |
| 52 | | | | | | | | | 9 | | | | title | Summary_Long |
| 53 | | | | title | Summary_Medium | 4 | | | | | | | title | Summary_Medium |
| 54 | title | Summary_Short | 7 | title | Summary_Short | 5 | title | Summary_Short | 8 | title | Summary_Short | 6 | title | Summary_Short |
| 55 | title | Title | 4 | title | Title | 2 | title | Title | 5 | title | Title | 4 | title | Title |
| 56 | title | Title_Brief | 5 | | | | title | Title_Brief | 6 | title | Title_Brief | 5 | title | Title_Brief |
| 57 | title | Title_Sort_Name | 6 | | | | title | Title_Sort_Name | 7 | | | | title | Title_Sort_Name |
| 58 | | | | | | | title | TMS_Episode_ID | 30 | | | | title | TMS_Episode_ID |
| 59 | title | TMS_ID | 23 | | | | | | | title | TMS_ID | 17 | title | TMS_ID |
| 60 | | | | title | TMS_Program_ID | 16 | | | 29 | | | | title | TMS_Program_ID |
| 61 | | | | title | TMS_Series_ID | 17 | title | TMS_Series_ID | | | | | title | TMS_Series_ID |
| 62 | title | Type | 1 | title | Type | 1 | title | Type | 3 | title | Type | 3 | title | Type |
| 63 | title | Year | 12 | | | | title | Year | 12 | title | Year | 9 | title | Year |

| Line | DP1 Section | DP1 Field | DP1 Order | DP2 Section | DP2 Field | DP2 Order | DP3 Section | DP3 Field | DP3 Order | DP4 Section | DP4 Field | DP4 Order | STB Section | STB Field | STB Order | Unified Section | Unified Field |
|---|---|---|---|---|---|---|---|---|---|---|---|---|---|---|---|---|---|
| 65 | movie | AdBreak_0 | 12 | movie | AdBreak_0 | 12 |  |  |  |  |  |  |  |  |  | movie | AdBreak_0 |
| 66 | movie | AdBreak_1 | 13 | movie | AdBreak_1 | 13 |  |  |  |  |  |  |  |  |  | movie | AdBreak_1 |
| 67 | movie | AdBreak_2 | 14 | movie | AdBreak_2 | 14 |  |  |  |  |  |  |  |  |  | movie | AdBreak_2 |
| 68 | movie | AdBreak_3 | 15 | movie | AdBreak_3 | 15 |  |  |  |  |  |  |  |  |  | movie | AdBreak_3 |
| 69 | movie | AdBreak_99 | 16 | movie | AdBreak_99 | 16 |  |  |  |  |  |  |  |  |  | movie | AdBreak_99 |
| 70 |  |  |  |  |  |  |  |  |  | movie | AdBreak_Lead_Black |  | movie | AdBreak_Lead_Black |  | movie | AdBreak_Lead_Black | 12 |
| 71 |  |  |  |  |  |  |  |  |  | movie | AdBreak_Mid_Roll |  | movie | AdBreak_Mid_Roll |  | movie | AdBreak_Mid_Roll | 14 |
| 72 |  |  |  |  |  |  |  |  |  | movie | AdBreak_Mid_Roll_Local |  | movie | AdBreak_Mid_Roll_Local |  | movie | AdBreak_Mid_Roll_Local | 17 |
| 73 |  |  |  |  |  |  |  |  |  | movie | AdBreak_Post_Roll |  | movie | AdBreak_Post_Roll |  | movie | AdBreak_Post_Roll | 15 |
| 74 |  |  |  |  |  |  |  |  |  | movie | AdBreak_Post_Roll_Local |  | movie | AdBreak_Post_Roll_Local |  | movie | AdBreak_Post_Roll_Local | 18 |
| 75 |  |  |  |  |  |  |  |  |  | movie | AdBreak_Pre_Roll |  | movie | AdBreak_Pre_Roll |  | movie | AdBreak_Pre_Roll | 13 |
| 76 |  |  |  |  |  |  |  |  |  | movie | AdBreak_Pre_Roll_Local |  | movie | AdBreak_Pre_Roll_Local |  | movie | AdBreak_Pre_Roll_Local | 16 |
| 77 |  |  |  | movie | Ad_Breaks | 2 |  |  | 4 |  |  |  |  |  |  | movie | Ad_Breaks |
| 78 | movie | Audio_Type | 2 |  |  |  | movie | Audio_Type |  | movie | Audio_Type |  | movie | Audio_Type | 2 | movie | Audio_Type | 3 |
| 79 |  |  |  |  |  |  |  |  |  | movie | Bit_Rate |  | movie | Bit_Rate |  | movie | Bit_Rate | 11 |
| 80 |  |  |  |  |  |  |  |  |  | movie | Codec |  | movie | Codec |  | movie | Codec | 10 |
| 81 | movie | Content_CheckSum | 4 | movie | Content_CheckSum | 4 | movie | Content_CheckSum | 3 | movie | Content_CheckSum |  | movie | Content_CheckSum |  | movie | Content_CheckSum | 5 |
| 82 | movie | Content_FileSize | 3 | movie | Content_FileSize | 3 | movie | Content_FileSize |  | movie | Content_FileSize |  | movie | Content_FileSize |  | movie | Content_FileSize | 4 |
| 83 | movie | ContentSegment_1 | 8 |  |  |  |  |  |  |  |  |  |  |  |  | movie | ContentSegment_1 |
| 84 | movie | ContentSegment_2 | 9 |  |  |  |  |  |  |  |  |  |  |  |  | movie | ContentSegment_2 |
| 85 | movie | ContentSegment_3 | 10 |  |  |  |  |  |  |  |  |  |  |  |  | movie | ContentSegment_3 |
| 86 | movie | ContentSegment_4 | 11 |  |  |  |  |  |  |  |  |  |  |  |  | movie | ContentSegment_4 |
| 87 |  |  |  | movie | Cuepoint_Structure |  |  |  |  |  |  |  |  |  |  | movie | Cuepoint_Structure |
| 88 |  |  |  |  |  |  |  |  |  | movie | Frame_Rate |  | movie | Frame_Rate |  | movie | Frame_Rate | 9 |
| 89 | movie | HDContent | 5 |  |  |  | movie | HDContent | 2 | movie | HDContent |  | movie | HDContent |  | movie | HDContent | 7 |
| 90 |  |  |  | movie | Languages |  |  |  |  |  |  |  |  |  |  | movie | Languages |
| 91 |  |  |  |  |  |  |  |  |  | movie | Resolution |  | movie | Resolution |  | movie | Resolution | 8 |
| 92 | movie | Screen_Format | 6 |  |  |  | movie | Screen_Format |  | movie | Screen_Format |  | movie | Screen_Format |  | movie | Screen_Format | 6 |
| 93 |  |  |  |  |  |  |  |  |  | movie | trickModesRestricted |  | movie | trickModesRestricted |  | movie | trickModesRestricted | 2 |
| 94 | movie | Type | 1 | movie | Type | 1 | movie | Type | 1 | movie | Type |  | movie | Type |  | movie | Type | 1 |
| 95 | movie | Viewing_Can_Be_Resumed | 7 |  |  |  |  |  |  |  |  |  |  |  |  | movie | Viewing_Can_Be_Resumed |
| 96 |  |  |  |  |  |  |  |  |  |  |  |  |  |  |  |  |  |
| 97 | poster | Content_CheckSum | 3 | poster | Content_CheckSum | 3 |  |  |  |  |  |  |  |  |  | poster | Type |
| 98 | poster | Content_FileSize | 2 |  |  |  |  |  |  |  |  |  |  |  |  | poster | Content_FileSize |
| 99 | poster | Image_Aspect_Ratio | 4 |  |  |  |  |  |  |  |  |  |  |  |  | poster | Content_CheckSum |
| 100 | poster | Type | 1 | poster | Type | 1 |  |  |  |  |  |  |  |  |  | poster | Image_Aspect_Ratio |

GENERATING UNIFIED METADATA FOR A PLURALITY OF DISTRIBUTION PLATFORMS

CROSS-REFERENCE TO RELATED APPLICATIONS/INCORPORATION BY REFERENCE

None.

FIELD OF TECHNOLOGY

Certain embodiments of the disclosure relate to a television broadcast system. More specifically, certain embodiments of the disclosure relate to a method and system for generating unified metadata for a plurality of distribution platforms.

BACKGROUND

Technological innovations in the television broadcasting and distribution platforms are changing the way media content is broadcasted and distributed. Broadcasting platforms usually refer to the types of networks by which content providers (or network operators) distribute packages of media content (such as video, images, and the like) and corresponding metadata to different distribution platforms (or content distributors). In other words, in the existing systems, for each media content delivered to a distribution platform, the broadcasting platform associates a metadata file with the media content customized for corresponding distribution platform. Once the media content is received, the distribution platforms further delivers the media content to subscribed viewers.

Therefore, existing systems may require installation of substantial infrastructure and resources for delivering customized metadata associated with media content to each distributed platform, which may eventually increase overall operating and maintaining cost of the content provider.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for generating unified metadata for a plurality of distribution platforms, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIGS. 3A to 3C depict exemplary data model of metadata comprising sections and fields per ADI specification required by each of the plurality of distribution platforms and further data model of the unified metadata file, in accordance with an exemplary embodiment of the disclosure.

DETAILED DESCRIPTION OF THE DISCLOSURE

Figure 1:
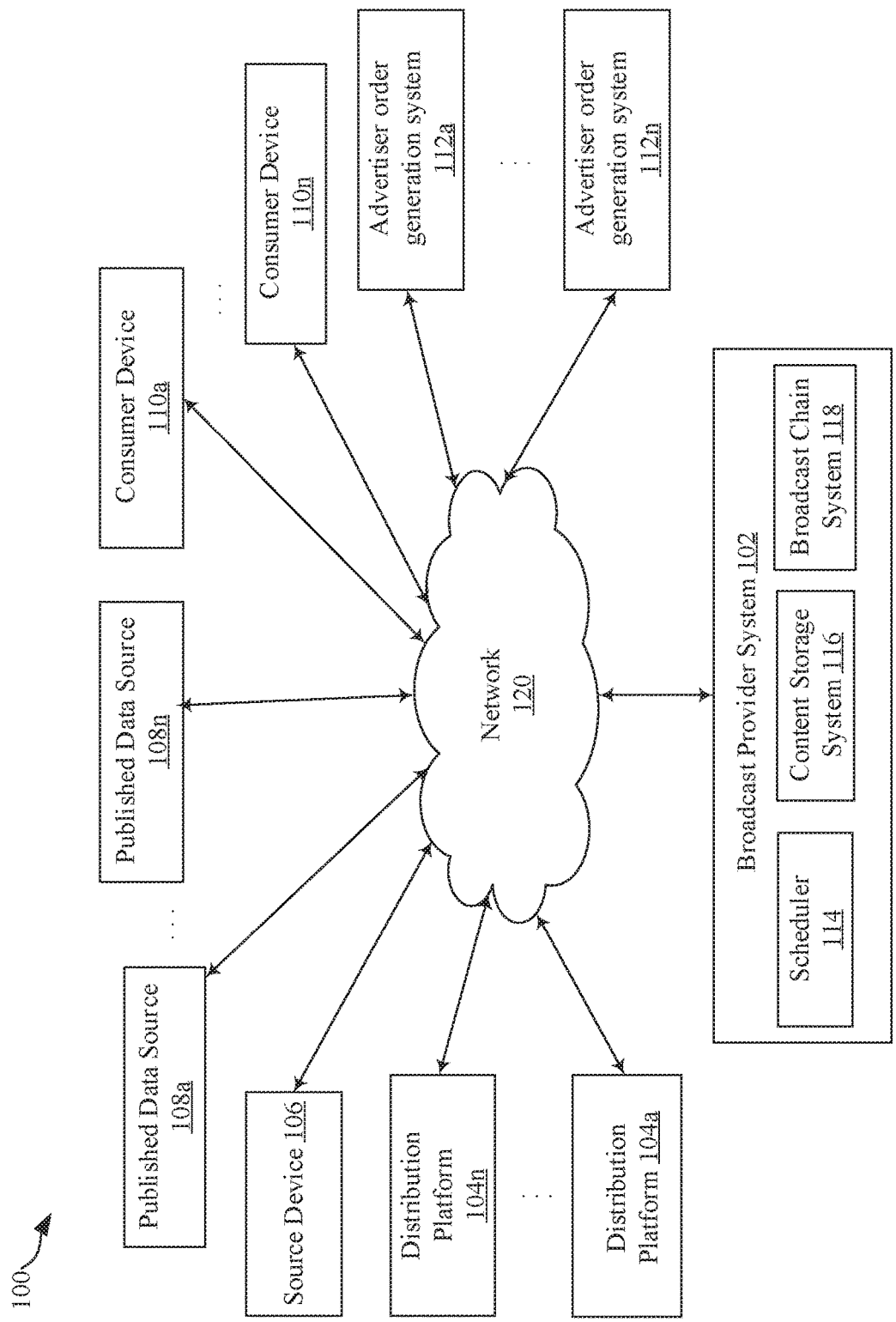
FIG. 1 is a block diagram that illustrates an exemplary system for generating unified metadata for a plurality of distribution platforms, in accordance with an exemplary embodiment of the disclosure.

Certain embodiments of the disclosure may be found in a method for generating a unified package for a plurality of distribution platforms. The method, in a broadcast provider system, may include receiving a linear media feed from a source device, and based on one or more inbound triggers associated with the received linear media feed, determine a plurality of segments of the received linear media feed. A unified metadata file comprising a universal schema of a plurality of category nodes and attributes for a plurality of distribution platforms may be generated based on at least a programming schedule of the received linear media feed and an asset distribution interface (ADI) specification required by each of the plurality of distribution platforms. Further, the method includes generating a unified package comprising the plurality of segments of the linear media feed as a broadcast media feed and the unified metadata file. Accordingly, the unified package may be transmitted to the plurality of distribution platforms, via a communication network.

In accordance with various embodiments, the linear media feed may be at least one of a live video feed or a pre-stored media feed. The unified metadata file may include at least one of a media item identifier of the linear media feed, a title of the linear media feed, a short summary of the plurality of segments, a file format, encryption information, length of the linear media feed, a date and/or time the linear media feed was added to a catalog of media items, a new item indicator for the linear media feed, a media item class, a sequence of the plurality of attributes defined with respect to a corresponding node of the plurality of category nodes, and program-specific information (PSI) data, and closed captioning data. In accordance with an embodiment, the method may include generating and updating the unified metadata file in real-time. One or more of the plurality of distribution platforms may re-package the encoded plurality of segments of the linear media feed and corresponding unified metadata based on one or more modifications required within the unified metadata file. The programming schedule may define a schedule of the linear media feed, ordering of the plurality of segments of the linear media feed during playout, and when to distribute the linear media feed.

In accordance with another aspect of the disclosure, there may be found a method, in a distribution platform, that includes receiving the unified package from the broadcast provider system via the communication network. The unified package may comprise the plurality of segments of broadcast media feed with the plurality of triggers, and the unified metadata file. The plurality of segments of the broadcast media feed with the plurality of triggers and the unified metadata file may be identified from the received unified package. A universal schema of the plurality of category nodes and attributes in the unified metadata file may be parsed based on at least an ADI specification required by the distribution platform. The plurality of segments of the broadcast media feed associated with the plurality of triggers and the parsed universal schema of the plurality of category nodes and attributes in the unified metadata file may be correlated in accordance with the ADI specification required by the distribution platform. The plurality of segments of the broadcast media feed may be transcoded to a transport stream. The transport stream package that includes at least the transport stream may be transmitted to one or more subscribed consumer devices through the communication network. In accordance with an embodiment, one or more watermarks may be included in the transport stream.

The method further includes storing the transport stream that includes the one or more watermarks with corresponding metadata, wherein the corresponding metadata is a subset of the unified metadata file in accordance with the ADI specification required by the distribution platform. The method may also include generating the transport stream package in accordance with the ADI specification required by the distribution platform, wherein the generated transport stream package further includes the one or more watermarks.

FIG. 1 is a block diagram that illustrates an exemplary system 100 for generating unified metadata for a plurality of distribution platforms, in accordance with an exemplary embodiment of the disclosure. Referring to FIG. 1, the exemplary system 100, comprises a broadcast provider system 102, a plurality of distribution platforms 104a, ..., 104n, a source device 106, a plurality of published data sources 108a, ..., 108n, a plurality of consumer devices 110a, ..., 110n, and a plurality of advertiser order generation systems 112a, ..., 112n. The broadcast provider system 102 further comprises a scheduler 114, a content storage system 116, and a broadcast chain system 118. There is further shown a communication network 120 through which the broadcast provider system 102, the plurality of distribution platforms 104a, ..., 104n, the source device 106, the plurality of published data sources 108a, ..., 108n, the plurality of consumer devices 110a, ..., 110n, and the plurality of advertiser order generation systems 112a, ..., 112n are communicatively coupled with each other.

The broadcast provider system 102 may comprise suitable logic, circuitry, and interfaces that may be configured to execute code that handles: (1) provision of media content, i.e. broadcast media feed (also referred to as a communication network television feed), comprising audio, video, and/or data and (2) corresponding metadata to the plurality of distribution platforms 104a, ..., 104n. The broadcast provider system 102 may be operated by a broadcasting company, which may be referred to as a broadcast provider (or broadcast operator), or a communication network provider (or network operator). The broadcast provider system 102 may handle a single channel, a plurality of channels, or one or more networks. The broadcast provider system 102 may be operable to provide the media content to the plurality of distribution platforms 104a, ..., 104n via one or more channels in the communication network 120, for example, traditional over-the-air broadcast channels, cable television networks, satellite communication networks, the Internet, and/or other content delivery networks (CDNs). The broadcast provider system 102 may be owned by (or associated to) a broadcast provider or operator, a communication network provider or operator, or a content provider or operator.

Each of the plurality of distribution platforms 104a, ..., 104n may comprise suitable logic, circuitry, and interfaces that may be configured to provide video programming services to viewers, usually for a subscription fee (such as pay television). Each of the plurality of distribution platforms 104a, ..., 104n may comprise a headend where the distribution platform assembles and prepares its multiple channels of video programming for distribution to the viewers. Each of the plurality of distribution platforms 104a, ..., 104n may receive the MPTS, which includes the signaling content and metadata, from the broadcast provider system 102 based on current society of cable telecommunication engineers (SCTE) standards (SCTE-35 and SCTE-224) to control web and regional blackouts, network end of day switching, and advertisement insertion. For example, the plurality of distribution platforms 104a, ..., 104n may be signaled for various blackout types with in-band SCTE-35 message. Further, the plurality of distribution platforms 104a, ..., 104n may receive program metadata that specifies certain events or operations, such as, for example, when to blackout shows, recording programs off the broadcast media feed for startover or Cx (x is an integer representing the number of day since original airing) (VOD) packaging, with SCTE-224 message. Examples of the plurality of distribution platforms 104a, ..., 104n may include direct-broadcast satellite (DBS) providers, cable television (CATV) systems, and other wireline video providers and competitive local exchange carriers (CLECs) using IPTV.

The source device 106 may comprise suitable logic, circuitry, and interfaces that may be configured to communicate a linear media feed and a programming schedule of a channel, such as an existing channel, to the broadcast provider system 102. In accordance with an embodiment, the linear media feed, that includes images, video and audio media content, may be transmitted to the broadcast provider system 102 on a serial digital interface (SDI) video interface and/or on a high-definition SDI (HD-SDI) video interface, which are defined by the Society of Motion Picture and Television Engineers (SMPTE). The source device 106 may be operated by the broadcast provider system 102, and communicatively coupled to the communication network 120.

Each of the plurality of published data sources 108a, ..., 108n may comprise suitable logic, circuitry, and interfaces that may be configured to execute code that provides actual viewership or rating for programs that were aired. As illustrated in FIG. 1, the plurality of published data sources 108a, ..., 108n are coupled to the broadcast provider system 102 via the communication network 120.

An exemplary published data source may be Nielsen. Nielsen has the capability to determine when a viewer watches the same set of media items, i.e. advertisements and/or promotional content, in programming data, such as an episode, in a broadcast media feed within 3 days of original airing, and provide Nielsen "C3" credit. In accordance with an embodiment, based on the Nielsen "C3" credit, the broadcast provider system 102 may be configured to generate a new channel, "D4 channel", which may be broadcasted on day "4" of the originally aired broadcast media feed. Another exemplary published data source may be a published database that provides ratings for media items, such as GRP. The GRP is an advertising impact measure or a promotion impact measure for each advertising and/or promotional campaigns, known in the art.

The plurality of consumer devices 110a, . . . , 110n may refer to end-user devices where the media content is rendered to be viewed by a viewer. The number of impressions of a media item, such as an advertisement and/or promotional content, on such plurality of consumer devices 110a, . . . , 110n determines the advertising impact or promotion impact and number of actual viewership achieved during campaigns. Examples of the plurality of consumer devices 110a, . . . , 110n may include, but are not limited to, connected TVs, connected TV with paired devices (e.g., tablets), and second screen devices such as smartphones and tablets.

Each of the plurality of advertiser order generation systems 112a, . . . , 112n may comprise suitable logic, circuitry, and interfaces that may be configured to place orders with the broadcast provider system 102 that may include information about type of advertisements to be broadcast, the number of advertisements to be broadcast, and when the advertisements should be aired. The broadcast provider system 102 may be configured to electronically receive, via the communication network 120, deals comprising advertisers' orders from the plurality of advertiser order generation systems 112a, . . . , 112n. The broadcast provider system 102 may be configured to receive an advertiser's order to place one or more advertisements into one or more commercial breaks. The advertiser order generation systems 112a, . . . , 112n may provide multiple orders, which need not be submitted at the same time. Therefore, the broadcast provider system 102 may continuously receive orders with new or additional advertisements to be placed and may need to update any previously determined commercial break schedule to accommodate the constraints and requirements of those advertisements already placed and of the new advertisements being received. In this regard, the advertiser order generation systems 112a, . . . , 112n may electronically book advertisements to a selling title, and within the selling title there are constraints. The advertiser's order comprises airing constraints and placement requirements corresponding to the one or more advertisements.

The scheduler 114 may comprise suitable logic, circuitry, and interfaces that may be configured to execute a code that handles a programming schedule of a channel. The programming schedule of a channel defines what media content should be scheduled, the ordering of the media content during playout, and when to distribute the media content. The media content that is distributed may include both the programming content, such as TV programs, and the non-programming content, such as advertisements or promotional media. The programming content may be hereinafter referred to as linear media feed.

In accordance with an embodiment, the programming schedule may be a text file or an XML file, that comprise a reference mapping of different media content items that needs to be managed by a stream manipulator. The programming schedule may be further configured to indicate a start and an end of one or more portions of the programming content and/or the non-programming content during distribution of the programming content and the non-programming content on the channel to be viewed on the plurality of consumer devices 110a, . . . , 110n. The programming schedule of the channel may be determined for a time period defined by the broadcast or network provider (network operator). The scheduler 114 may receive a programming schedule of an existing channel from a distribution source device. The scheduler 114 may modify the received programming schedule to include the determined targeted media content.

The content storage system 116 may comprise suitable logic, circuitry, and interfaces that may be configured to execute code to temporarily store received linear media feed from one or more broadcast source devices, such as the source device 106. The content storage system 116 may be further configured to maintain a repository of various programming data, such as movies, music videos, documentary videos, and/or the like, in a storage buffer system. Unified metadata associated with the various programming content and/or non-programming content may also be stored in the content storage system 116. The unified metadata may include rules or rules related to the programming content and/or non-programming content. For example, the unified metadata may specify whether or not the programming content and/or non-programming content may be archived, and if so, when and where it may be archived. The unified metadata may also specify whether or not the programming content and/or non-programming content may be blocked (blocked-out), and if so where and what portions may be blocked. The content storage system 116 may be configured to distribute such metadata to the plurality of distribution platforms 104a, . . . , 104n or external affiliates for individual networks via SCTE-224 (originally DVS1179) message. The SCTE-224 specification defines encryption, timings and basic program information to distribute, and other information to look for in the broadcast media feed to indicate starts and stops of programming content. The content storage system 116 may be further configured to update the unified metadata in real-time based on information related to at least a schedule of programming data, advertisement and promotional content, an updated schedule, and titles associated with the programming data.

The broadcast chain system 118 may comprise suitable logic, circuitry, and interfaces that may be configured to receive actual media content from the source device 106, for example, from a production studio, in a SDI video interface and/or on a high-definition SDI (HD-SDI) video interface. The broadcast chain system 118 may further process the media content, such as insertion of graphics, closed captions, preparation of programming schedule, insertion of triggers, and the like, and final delivery by the broadcast provider system 102. The communicated linear media feed and the schedule may correspond to a channel, such as CNN channel, that is broadcast to the plurality of distribution platforms 104a, . . . , 104n, via a communication network, such as the communication network 120. The linear media feed may be broadcasted as a multi-program transport stream (MPTS) (also referred to as a broadcast media feed) to the plurality of distribution platforms 104a, . . . , 104n, via the communication network 120.

The communication network 120 may be any kind of network, or a combination of various networks, and it is shown illustrating the communication that may occur between the broadcast provider system 102, the plurality of distribution platforms 104a, . . . , 104n, the source device 106, the plurality of published data sources 108a, . . . , 108n, the plurality of consumer devices 110a, . . . , 110n, and the plurality of advertiser order generation systems 112a, . . . , 112n. For example, the communication network 120 may comprise one or more of a cable television network, the Internet, a satellite communication network, a wide area communication network (WAN), a medium area communication network (MAN), a local area communication network (LAN), an analogue terrestrial network, a digital terrestrial network, a direct-to-home satellite network, cable, an Internet Protocol (IP), and an over-the-top television (OTT) network.

In operation, the broadcast provider system 102 may include one or more processors configured to receive the linear media feed from the source device 106. The broadcast chain system 118 may be configured to determine the plurality of segments of the received linear media feed based on the one or more inbound triggers associated with the received linear media feed. The broadcast chain system 118 may be configured to generate the unified metadata file comprising the universal schema of the plurality of category nodes and attributes for the plurality of distribution platforms 104a, . . . , 104n based on at least a programming schedule of the received linear media feed and ADI specification required by each of the plurality of distribution platforms 104a, . . . , 104n. The broadcast chain system 118 may be further configured to generate a unified package comprising the plurality of segments of the linear media feed as a broadcast media feed and the generated unified metadata file for the plurality of distribution platforms 104a, . . . , 104n. The broadcast chain system 118 may be further configured to transmit the generated unified package to the plurality of distribution platforms 104a, . . . , 104n via a communication network, such as the communication network 120.

The broadcast provider system 102 may be configured to provide various enhancements. For example, the broadcast provider system 102 may add a license window end and start in the unified metadata file to facilitate providing different data to each distribution platform of the plurality of distribution platforms 104a, . . . , 104n, based on date/timestamp structure. Further, the broadcast provider system 102 may be configured to add alternate license windows so that the unified metadata file covers both "D4" and "D1" assets. The alternate license windows enable the same asset and same metadata for the replacement of "D4" asset with "D1" asset. The broadcast provider system 102 may be configured to support different raster sizes for multiple images on different distribution platforms to modify image and orientation in accordance with the requirement of the consumer devices, such as mobile devices or web-based platforms. The broadcast provider system 102 may be further configured to support language enhancements on primary, secondary, and tertiary tracks by providing a better way to communicate the media content that is much more meaningful for the affiliates.

Consequently, the plurality of distribution platforms 104a, . . . , 104n may receive the unified package from the broadcast provider system 102 via the communication network, such as the communication network 120. The unified package comprises the plurality of segments of broadcast media feed with the plurality of triggers, and the unified metadata file. For example, the distribution platform 104a upon receiving the unified package from the broadcast provider system 102, may identify the plurality of segments of the broadcast media feed with the plurality of triggers and the unified metadata file from the received unified package. The distribution platform 104a may be further configured to parse a universal schema of the plurality of category nodes and attributes in the unified metadata file based on at least the ADI specification required by the distribution platform 104a. The distribution platform 104a may be further configured to correlate the plurality of segments of the broadcast media feed associated with the plurality of triggers and the parsed universal schema of the plurality of category nodes and attributes in the unified metadata file in accordance with the ADI specification required by the distribution platform 104a. The distribution platform 104a may be further configured to transcode the plurality of segments of broadcast media feed to a transport stream, and transmit a transport stream package that includes at least the transport stream to one or more subscribed consumer devices through a communication network.

Figure 2A:
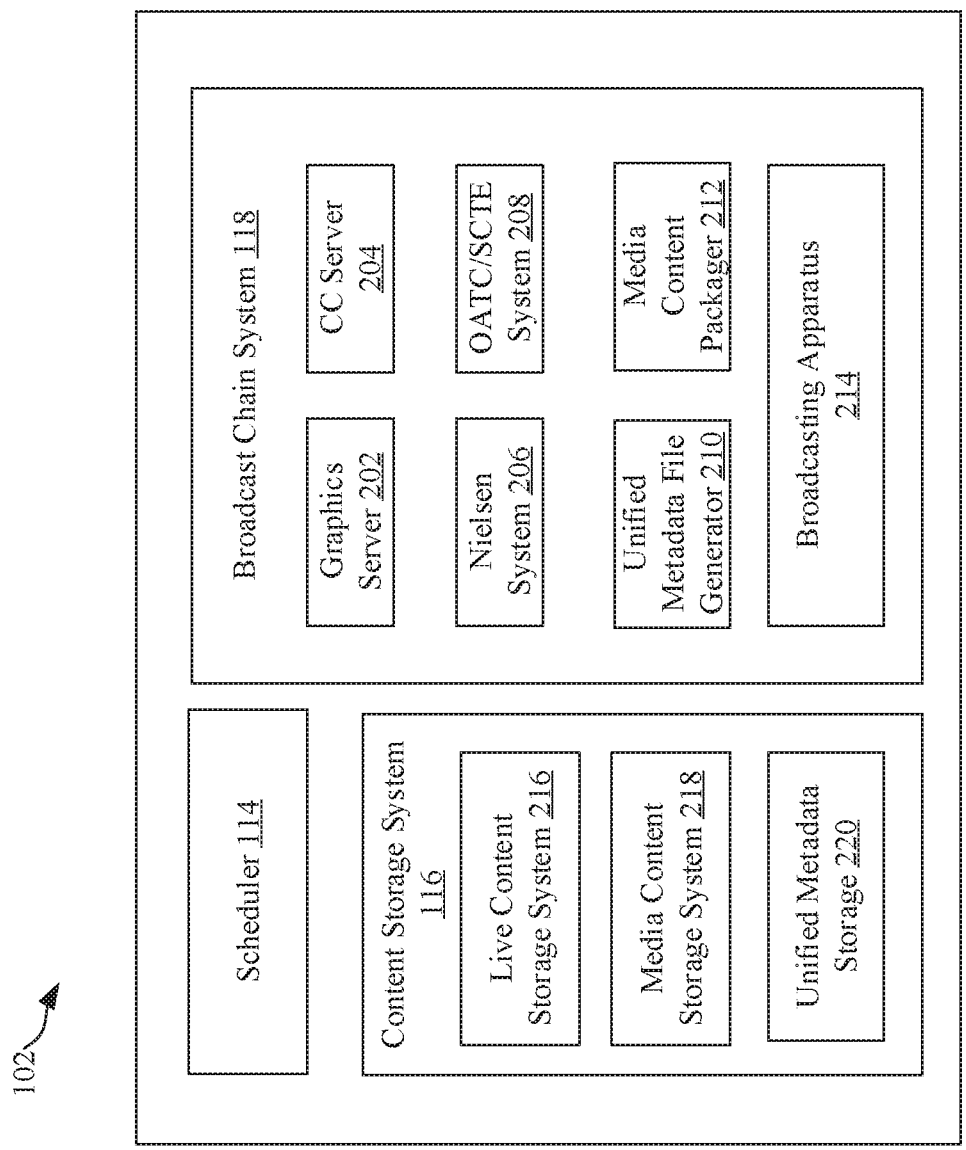
FIG. 2A is a block diagram that illustrates an exemplary broadcast provider system for broadcasting unified package to a plurality of distribution platforms, in accordance with an exemplary embodiment of the disclosure.

FIG. 2A is a block diagram that illustrates an exemplary broadcast provider system 102 for generating unified metadata for a plurality of distribution platforms 104a, . . . , 104n, in accordance with an exemplary embodiment of the disclosure. FIG. 2A is described in conjunction with FIGS. 3A to 3C. FIGS. 3A to 3C depict exemplary data model of metadata comprising sections and fields per ADI specification required by each of the plurality of distribution platforms and further data model of the unified metadata file, in accordance with an exemplary embodiment of the disclosure.

Referring to FIG. 2A, the exemplary broadcast provider system 102, comprises a graphics server 202, a closed captioning (CC) server 204, a Nielsen system 206, an OATC/SCTE system 208, a unified metadata file generator 210, a media content packager 212, and a broadcasting apparatus 214, communicatively coupled with each other.

The graphics server 202 may comprise suitable logic, circuitry, and interfaces that may be configured to receive on-screen view of the plurality of segments and insert a plurality of graphics on the on-screen view of the plurality of segments. The plurality of graphics may be inserted on the on-screen view based on the time-based parameter and/or the region-based parameter specified in the programming schedule. For example, the plurality of graphics may be overlaid on the on-screen view of plurality of segments during multicasting of the channel at the timecodes or timing identifier indicated by the time-based parameter in the programming schedule. The plurality of graphics may be overlaid at specific regions or sections on the on-screen view of the plurality of segments indicated by the region-based parameter specified in the programming schedule. The plurality of graphics to be overlaid on the on-screen view may be extracted from the content storage system 116. In another embodiment, the plurality of graphics may be retrieved from a graphics engine (or from specified locations as indicated by a file path or a Uniform Resource Locator (URL) in the programming schedule). Based on the insertion of the plurality of graphics on the on-screen view of the plurality of segments, the graphics server 202 may communicate the on-screen view to the CC server 204.

The CC server 204 may comprise suitable logic, circuitry, and interfaces that may be configured to receive the on-screen view comprising the media content and the plurality of graphics from the graphics server 202. The CC server 204 may be configured to insert closed caption, for example, sub-titles, on the on-screen view of the plurality of segments. The closed caption may be inserted based on the content associated with the on-screen view and/or the programming schedule. Further, the closed caption may be determined in real-time or non-real time based on at least the content associated with the on-screen view, by the CC server 204. The CC server 204 may further communicate the on-screen view to the Nielsen system 206.

The Nielsen system 206 may comprise suitable logic, circuitry, and interfaces that may be configured to receive the on-screen view of the plurality of segments from the CC server 204. The Nielsen system 206 may be configured to apply (or embed) Nielsen watermarks in the content associated with the on-screen view of the plurality of segments. For example, in linear broadcast chain, the Nielsen system 206 may append watermarks to audio content and/or video content associated with the on-screen view of the plurality of segments. Such Nielsen watermarks may be used to track the linear broadcast's audience. The Nielsen system 206 may further communicate the on-screen view to the OATC/SCTE system 208.

The OATC/SCTE system 208 may comprise suitable logic, circuitry, and interfaces that may be configured to execute code that handles insertion of SCTE 104/35, a plurality of cues or triggers in the linear media feed. In this regard, the OATC/SCTE system 208 may be configured to insert the cues or triggers as per SCTE-104-based digital ad-marker or society of motion picture and television engineers (SMPTE) 2010 standards. Various examples of such plurality of cues or triggers may be splice points, such as program start, program end, content placement opportunity start/end, commercial break start, commercial break end, promotional content start, promotional content end, advertisement start/end, and the like. The splice points may refer to points of transition from one interstitial content item to another interstitial content item or from main program segments to an interstitial content item.

The unified metadata file generator 210 may comprise suitable logic, circuitry, and interfaces that may be configured to execute code to generate the unified metadata file comprising a universal schema of a plurality of category nodes and attributes for the plurality of distribution platforms 104a, . . . , 104n. The unified metadata file generator 210 may generate the unified metadata file based on at least a programming schedule of the received linear media feed and an ADI specification required by each of the plurality of distribution platforms 104a, . . . , 104n.

Accordingly, the unified package may be generated and distributed (broadcast, simulcast, multicasting, stream on a channel) to the plurality of distribution platforms 104a, . . . , 104n, via the communication network 120. The media content packager 212 may receive a media feed (e.g. audio feed or media feed) that corresponds to the programming content from the source device 106 associated with the broadcast provider system 102. Further, the media content packager 212 may determine a plurality of segments of the received linear media feed based on one or more in-band triggers associated with the received linear media feed. Based on a schedule generated by the scheduler 114, the media content packager 212 may generate a unified package of the plurality of segments, which are encoded, and the unified metadata file. In accordance with an embodiment, the media content packager 212 may be integrated with a plurality of other embedded components, such as one or more encoders, a multiplexer (MUX), and a data embedding system, to generate the unified package. In accordance with another embodiment, the media content packager 212 may be integrated with a plurality of other components, such as the one or more encoders, the MUX, and the data embedding system, via the communication network 120, to generate the unified package.

The one or more encoders may comprise suitable logic, circuitry, and interfaces that may be configured to execute code that may be configured to receive the linear media feed with a plurality of triggers (as SCTE-104—inserted message) from the OATC/SCTE system 208. The one or more encoders may encode the SCTE-104 message and convert the SCTE-104 message to SCTE-35 message. The one or more encoders may encode the linear media feed with the plurality of triggers by varying bitrates. An example of such one or more encoders may be Mezzanine encoder, known in the art.

The MUX may comprise suitable logic, circuitry, and interfaces that may be configured to execute code that may receive the encoded linear media feed with the plurality of triggers (as SCTE-35-based message) and multiplex with the unified metadata file related to the encoded linear media feed with the plurality of triggers, which is received from the content storage system 116, in conjunction with the data embedding system. Thus, the MUX may facilitate the broadcasting of the unified metadata (as SCTE-224 message) along with the encoded linear media feed with the plurality of triggers (as SCTE-35 message) in one or more configurations. In accordance with a first configuration, the unified metadata file is broadcasted in-band with the encoded linear media feed with the plurality of triggers, via the satellite communication network. In accordance with a second configuration, the unified metadata file is broadcasted out-of-band separately from the encoded linear media feed with the plurality of triggers, via content delivery (CDN) network.

The data embedding system may comprise suitable logic, circuitry, and interfaces that may be configured to execute code that may receive the unified metadata file from the content storage system 116 and transmit it to the MUX where the unified metadata file is multiplexed with the encoded linear media feed with the plurality of triggers. Accordingly, the unified metadata file is broadcasted in-band with the encoded linear media feed with the plurality of triggers.

In this regard, for example, the media content packager 212 may be operable to receive one or more MPEG2 transport stream (TS) and convert the corresponding content to one or more output formats (for example, various hypertext transfer protocol (HTTP) formats, such as HLS, protected HLS, Smooth Streams, and dynamic adaptive streaming over HTTP (DASH)) based on, for example, bitrate of a target computing device.

The broadcasting apparatus 214 may be a device which broadcasts an electromagnetic signal corresponding to the unified package in the one or more output formats to the plurality of distribution platforms 104a, . . . , 104n. The broadcasting apparatus 214 may be analog or digital. In an example, the broadcasting apparatus 214 transmits the unified package for channels that are unencrypted and therefore free-to-air or free-to-view. In another example, the broadcasting apparatus 214 transmits the unified package for the channels with encryption (pay television), and thus requiring a subscription by the plurality of consumer devices 110a, . . . , 110n via the plurality of distribution platforms 104a, . . . , 104n. In such a case, the encryption may be based on conditional access (CA) or digital rights management (DRM) technology, known in the art. The broadcasting apparatus 214 may act as a source device or a source of receipt of the unified package for the distribution platforms 104a, . . . , 104n.

The live content storage system 216 may comprise suitable logic, circuitry, and interfaces that may be configured to store live media content segments of one or more real-time media content streams of channels, for example, a live media feed of a CNN channel. Such live media feed may be distributed in real-time on the channel to the plurality of distributed platforms 104a, . . . , 104n to be viewed by the plurality of consumer devices 110a, . . . , 110n. The live content storage system 216 may be communicatively coupled to the communication network 120 to receive the one or more live media feeds of channels.

The media content storage system 218 may comprise suitable logic, circuitry, and interfaces that may be configured to store one or more pre-encoded media content segments of non-real time programming data, for example, movies, music videos, clips of various shows or programs, and/or the like. Such one or more pre-encoded media content segments may be distributed on the channel to the plurality of distributed platforms 104a, . . . , 104n to be viewed by the plurality of consumer devices 110a, . . . , 110n, based on a demand by the users. The media content storage system 218 may be communicatively coupled to the communication network 120.

The unified metadata storage 220 may comprise suitable logic, circuitry, and interfaces that may be configured to store metadata of the programming and/or non-programming content. For example, the unified metadata storage 220 may store the unified metadata file that include rules related to the programming content and/or non-programming content. For example, the unified metadata may specify whether or not the programming content and/or non-programming content may be archived, and if so when and where can it be archived. The unified metadata may also specify whether or not the programming content and/or non-programming content may be blocked out, and if so where and what portions may be blocked out. The unified metadata may further include the one or more in-band triggers of the programming content and/or the non-programming content. The unified metadata may further include one or more attributes of the programming content and/or the non-programming content, such as start time and end time of one or more portions of the programming content and/or the non-programming content.

In accordance with an embodiment, the unified metadata storage 220 may include metadata associated with live content segments of one or more live feeds of channels stored in the live content storage system 216. The unified metadata storage 220 may include metadata associated with media content segments stored in the media content storage system 218. Other examples of the unified metadata may include a media item identifier, a title of the media item, a short summary of the content segments, a file format, encryption information, length of the media item, a date and/or time the media item was added to the catalog of media items, a new item indicator for the media item, a media item class, for example, a television show, a cartoon program, a movie, a news media, an episode, a game, a clip, a recorded sports event, interactive media, and/or the like. In accordance with an embodiment, the unified metadata may also store program-specific information (PSI) data as defined by ISO/IEC13818-1 (MPEG-2), closed captioning data, and one or more in-band triggers of the linear media feed associated with the live content segments stored in the live content storage system 216 and the media content storage system 218.

In operation, the scheduler 114 in the broadcast provider system 102 may be configured to receive a specific schedule, which corresponds to a linear media feed of a channel broadcasted to the plurality of distribution platforms 104a, . . . , 104n, from the source device 106. In an example, the source device 106 may be a D4 schedule source. The specific schedule may include one or more scheduling rules that may correspond to the linear media feed of the channel broadcasted to the distribution platforms 104a, . . . , 104n. Examples of such one or more scheduling rules are described in FIG. 4A.

In an embodiment, the linear media feed may correspond to a linear stream of multimedia frames of programming content provided by a media content source, such as the source device 106. The linear media feed may correspond to an uncompressed SDI video and may be embedded with the ancillary data, such as the close caption data, format definition data, VITC, and/or the like in the broadcast chain system 118. In various embodiments, the linear media feed is at least one of a live video feed or a pre-stored media feed and may be associated with one or more inbound triggers.

In accordance with an embodiment, based on the one or more inbound triggers associated with the received linear media feed, the broadcast chain system 118 may be configured to determine the plurality of segments of the received linear media feed. Based on the determined plurality of segments of the received linear media feed, the broadcast chain system 118 may be configured to determine one or more spots where non-programming content may be inserted. In certain embodiments, the one or more spots may be utilized for inserting other desired content based on, for example, a geographical region associated with the distribution platform 104a.

In accordance with an embodiment, the graphics server 202 may be configured to insert a plurality of graphics on the on-screen view of the plurality of segments of the received linear media feed. The plurality of graphics may be inserted on the on-screen view based on the time-based parameter and/or the region-based parameter specified in the programming schedule. Thereafter, the CC server 204 may be configured to insert closed caption, for example, sub-titles, on the on-screen view of the plurality of segments of the received linear media feed. Further, the Nielsen system 206 may append watermarks to audio content and/or video content associated with the on-screen view of the plurality of segments of the received linear media feed. Such Nielsen watermarks may be used to track the linear broadcast's audience. Also, the OATC/SCTE system 208 may be configured to handle insertion of SCTE 104/35, a plurality of cues or triggers in the plurality of segments of the received linear media feed. Various examples of such plurality of cues or triggers may be splice points, such as program start, program end, content placement opportunity start/end, commercial break start, commercial break end, promotional content start, promotional content end, advertisement start/end, and the like. Thereafter, one or more encoders in the media content packager 212 may be configured to encode the plurality of segments of the linear media feed with a plurality of triggers (as SCTE-104—inserted message) received from the OATC/SCTE system 208.

In accordance with an embodiment, the unified metadata file generator 210 may be configured to generate a unified metadata file comprising universal schema of a plurality of category nodes and attributes for the plurality of distribution platforms 104a, . . . , 104n. The unified metadata file may be generated based on at least programming schedule of received linear media feed and an ADI specification required by each of plurality of distribution platforms 104a, . . . , 104*n*. The unified metadata file generator 210 may be configured to generate and update the unified metadata in real-time.

The unified metadata may include at least one of a media item identifier of the linear media feed, a title of the linear media feed, a short summary of the plurality of segments, a file format, encryption information, timing information associated with one or more commercial breaks, a schedule to play non-programming content, such as one or more advertisements and/or promotional content, within programming content of the linear media feed, length of the linear media feed, a date and/or time the linear media feed was added to a catalog of media items, a new item indicator for the linear media feed, a media item class, a sequence of the plurality of attributes defined with respect to a corresponding node of the plurality of category nodes, and PSI data, and closed captioning data.

In accordance with an embodiment, referring to FIGS. 3A to 3C, there are depicted a data model of metadata comprising sections (or asset classes) and fields (or App_Data Names) per ADI specification required by four of the plurality of distribution platforms 104*a*, . . . , 104*n*. The four distribution platforms are named herein as "DP1", "DP2", "DP3", and "DP4". There is further depicted data model of the unified metadata file comprising sections (or asset classes) and fields (or App_Data Names), corresponding to assets and metadata respectively, as generated by the broadcast provider system 102, in accordance with an exemplary embodiment of the disclosure. In accordance with an embodiment, the unified metadata file should be in a format that is compatible with the W3C Extensible Markup Language (XML).

For example, the format of the asset structure for the distribution platform "DP1" is: package, title, movie, and poster, per ADI specification required by distribution platform "DP1". Similarly, the format of the asset structure for the distribution platform "DP2" is: package, title, movie, and poster, per ADI specification required by distribution platform "DP2". However, the format of the asset structure for the distribution platform "DP3" is: package, title, and movie, per ADI specification required by distribution platform "DP3". Similarly, the format of the asset structure for the distribution platform "DP4" is: package, title, and movie, per ADI specification required by distribution platform "DP4". It may be noted that the title asset may be included under the package asset, and the movie and the poster assets may be included under the title asset.

It may be noted that the metadata items may be considered to correspond to Movies on Demand (MOD), as they have been specific to the MOD application; however, most of such metadata items may be considered to correspond to Video on Demand (VOD) or Subscription Video on Demand (SVOD), where similar assets may be used in conjunction with other applications.

Now, for each section of corresponding distribution platform, the fields may be same or different, again per ADI specification required by corresponding distribution platform. For example, for the section (or asset class) "package" of distribution platforms "DP1", "DP2", and "DP3", the corresponding field is "Metadata_Spec_Version" (representing the version of the VOD Content Specification for corresponding package), indicated in line number 1 in FIG. 3A. However, for the section "package" of distribution platform "DP4", the corresponding fields are "Metadata_Spec_Version" (representing the version of the VOD Content Specification for corresponding package) and "Provider_Content_Tier" (representing which broadcast provider content tiers are to be identified with the asset) with an order of "1" and "2", respectively, indicated in line numbers 1 and 2 in FIG. 3A. Accordingly, based on the ADI specifications required by all four distribution platforms "DP1", "DP2", "DP3", and "DP4", for the section "package" of the unified metadata, the corresponding fields are: Metadata_Spec_Version and Provider_Content_Tier with an order of "1" and "2", respectively, indicated in line numbers 1 and 2 in FIG. 3A.

Corresponding to the title asset of distribution platform "DP1", the various fields (or metadata) may correspond to, for example, Actors, Actors_Display, Ad_Content_ID, Advisories, Billing_ID, Box_Office, Category, Closed_Captioning, Contract_Name, Display_Run_Time, Distributor_Royalty_Minimum, Distributor_Royalty_Percent, Genre, Guide_Category, Licensing_Window_End, Licensing_Window_Start, Preview_Period, Program_Type, Provider_QA_Contact, Rating, Run_Time, Service_Category, Suggested_Price, Summary_Short, Title, Title_Brief, Title_Sort_Name, TMS_ID, Type, and Year, indicated in line numbers 9 to 68 in FIGS. 3A to 3C.

Corresponding to the title asset of distribution platform "DP2", the various fields (or metadata) may correspond to, for example, Ad_Content_ID, Advisories, Country_of_Origin, EpisodeName, Episode_Number, Genre, Keywords, Licensing_Window_End, Licensing_Window_Start, Metadata_Language, MSORating, Original_Premiere_Date, Programming_Type, Provider_QA_Contact, Rating, Run_Time, Season_Number, Series_Description, Series_Name, Show_Type, Studio, Summary_Medium, Summary_Short, Title, TMS_Program_ID, TMS_Series_ID, Type indicated in line numbers 11 to 67 in FIGS. 3A to 3C.

Corresponding to the title asset of distribution platform "DP3", the various fields (or metadata) may correspond to, for example, Actors, Actors_Display, Ad_Content_ID, Advisories, Billing_ID, Category, Closed_Captioning, ComscoreID, Content_Type, Episode_ID, Episode_Name, Genre, Licensing_Window_End, Licensing_Window_Start, NielsenCensusCategoryID, NielsenClientID, NielsenVideoCensus, Original_Air_Date, Provider_QA_Contact, Rating, Run_Time, Season_Number, Series_Name, Show_Type, Studio, Summary_Long, Summary_Short, Title, Title_Brief, Title_Sort_Name, TMS_Episode_ID, TMS_Series_ID Type, and Year, indicated in line numbers 9 to 68 in FIGS. 3A to 3C.

Corresponding to the title asset of distribution platform "DP4", the various fields (or metadata) may correspond to, for example, Actors, Actors_Display, Ad_Content_ID, Billing_ID, Box_Office, Category, Category, Closed_Captioning, Content_Labels, Display_Run_Time, Distributor_Royalty_Minimum, Distributor_Royalty_Percent, Episode_Name, Episode_Number, Genre, Licensing_Window_End, Licensing_Window_Start, Preview_Period, Provider_QA_Contact, Rating, Run_Time, Season_Number, Series_Name, Show_Type, Suggested_Price, Summary_Short, Title, Title_Brief, TMS_ID, Type, and Year, indicated in line numbers 9 to 68 in FIGS. 3A to 3C.

Corresponding to the title assets of all the distribution platforms "DP1" to "DP4", the various fields for the unified metadata may correspond to, for example, Actors, Actors_Display, Ad_Content_ID, Advisories, Billing_ID, Box_Office, Category, Category, Closed_Captioning, ComscoreID, Content_Labels, Content_Type, Content_Name, Country_of_Origin, Cue_Points, Display_Run_Time, Distributor_Royalty_Minimum, Distributor_Royalty_Percent, Episode_ID, Episode_Name, Episode_Number, Genre, Guide_category, Keywords, Licensing_Window_End, Licensing_Window_Start, Metadata_Language, MSORating, NielsenCensusCategoryID, NielsenClientID, NielsenVideoCensus, Original_Air_Date, Original_Premiere_Date, Preview_Period, Program_Type, Programming_Type, Provider_QA_Contact, Rating, Run_Time, Season_Number, Series_Description, Series_Name, Service_Category, Show_Type, Studio, Suggested_Price, Summary_Long, Summary_Medium, Summary_Short, Title, Title_Brief, Title_Sort_Name, TMS_Episode_ID, TMS_ID, TMS_Program_ID, TMS_Series_ID, Type, and Year, indicated in line numbers 9 to 68 in FIGS. 3A to 3C.

Corresponding to the movie asset of distribution platform "DP1", the various fields (or metadata) may correspond to, for example, AdBreak_0, AdBreak_1, AdBreak_2, AdBreak_3, AdBreak_99, Audio_Type, Content_CheckSum, Content_FileSize, ContentSegment_1, ContentSegment_2, ContentSegment_3, ContentSegment_4, HDContent, Screen_Format, Type, Viewing_Can_Be_Resumed, indicated in line numbers 70 to 100 in FIG. 3C.

Corresponding to the movie asset of distribution platform "DP2", the various fields (or metadata) may correspond to, for example, AdBreak_0, AdBreak_1, AdBreak_2, AdBreak_3, Ad_Breaks, Content_CheckSum, CuePoint_Structure, Languages, and Type, indicated in line numbers 70 to 99 in FIG. 3C.

Corresponding to the movie asset of distribution platform "DP3", the various fields (or metadata) may correspond to, for example, Audio_Type, Content_CheckSum, Content_FileSize, HDContent, Screen_Format, and Type, indicated in line numbers 70 to 99 in FIG. 3C.

Corresponding to the movie asset of distribution platform "DP4", the various fields (or metadata) may correspond to, for example, AdBreak_Lead_Black, AdBreak_Mid_Roll, AdBreak_Mid_Roll_Local, AdBreak_Post_Roll, AdBreak_Post_Roll_Local, AdBreak_Pre_Roll, AdBreak_Pre_Roll_Local, Audio_Type, Bit_Rate, Codec, Content_CheckSum, Content_FileSize, Frame_Rate, HDContent, Resolution, Screen_Format, trickModesRestricted, and Type, indicated in line numbers 70 to 99 in FIG. 3C.

Corresponding to the title assets of all the distribution platform "DP1" to "DP4", the various fields for the unified metadata may correspond to, for example, AdBreak_0, AdBreak_1, AdBreak_2, AdBreak_3, AdBreak_99, AdBreak_Lead_Black, AdBreak_Mid_Roll, AdBreak_Mid_Roll_Local, AdBreak_Post_Roll, AdBreak_Post_Roll_Local, AdBreak_Pre_Roll, AdBreak_Pre_Roll_Local, Ad_Breaks, Audio_Type, Bit_Rate, Codec, Content_CheckSum, Content_FileSize, ContentSegment_1, ContentSegment_2, ContentSegment_3, ContentSegment_4, CuePoint_Structure, Frame_Rate, HDContent, Languages, Resolution, Screen_Format, trickModesRestricted, Type and Viewing_Can_Be_Resumed, indicated in line numbers 70 to 100 in FIG. 3C.

Corresponding to the poster asset of distribution platform "DP1", the various fields (or metadata) may correspond to, for example, Content_CheckSum, Content_FileSize, Image_Aspect_Ratio, and Type, indicated in line numbers 102 to 105 in FIG. 3C.

Corresponding to the poster asset of distribution platform "DP2", the various fields (or metadata) may correspond to, for example, Content_CheckSum, and Type, indicated in line numbers 102 to 105 in FIG. 3C.

Corresponding to the poster assets of all the distribution platforms "DP1" to "DP4", the various fields for the unified metadata may correspond to, for example, Content_CheckSum, Content_FileSize, Image_Aspect_Ratio, and Type, indicated in line numbers 102 to 105 in FIG. 3C.

It may be noted that the above asset structure should not be construed to limiting the scope of the disclosure, as it is being described merely for exemplary purpose. In alternative embodiments, there may be additional or alternative distribution platforms having different ADI specifications, and thus different asset structures and additional or alternative fields (or metadata). Accordingly, the unified metadata may include all the fields (or metadata) of corresponding assets.

Corresponding to the various assets of all the distribution platforms "DP1" to "DP4", and the unified metadata as well, the unified metadata file generator 210 may generate a single XML schema file to be shared with the plurality of distribution platforms 104*a*, . . . , 104*n*. The XML schema file may define the package and assets, such as title, movie, and poster, as the plurality of child category nodes under a parent node "ADI". The XML schema file may define the fields (or metadata) corresponding to the assets, as the plurality of attributes. The XML schema file may define the values of the fields as the attribute values. Thus, the XML schema may describe and validate the structure and the content of XML data to be shared by the broadcast provider system 102 with the multiple distribution platforms.

Thereafter, the media content packager 212 may be configured to generate the unified package comprising the encoded plurality of segments of the linear media feed and the generated unified metadata for the plurality of distribution platforms 104*a*, . . . , 104*n*. In an embodiment, while generating the unified package, the MUX in the media content packager 212 may be configured to receive the encoded plurality of segments of the linear media feed with the plurality of triggers (as SCTE-35-based message) and multiplex with the unified metadata (as SCTE-224 message) related to the encoded plurality of segments of the linear media feed with the plurality of triggers, in conjunction with the data embedding system. The data embedding system may receive the unified metadata from the content storage system 116 and transmit it to the MUX where the unified metadata is multiplexed as SCTE-224 message with the encoded plurality of segments of the linear media feed with the plurality of triggers. The media content packager 212 may thus convert the MPEG2 TS of the linear media feed to one or more output formats (for example, various HTTP formats, such as HLS, protected HLS, Smooth Streams, and DASH) based on, for example, bitrate of a target computing device. Thus, the media content packager 212 may be configured to control encoding, multiplexing and packaging of the programming content (that corresponds to plurality of segments of the linear media feed) and the non-programming content with the unified metadata file.

Once the unified package is generated by the media content packager 212, the broadcasting apparatus 214 may be configured to transmit (or broadcast) electromagnetic signals corresponding to the generated unified package in the one or more output formats to the plurality of distribution platforms 104*a*, . . . , 104*n*, via the communication network 120. In accordance with an embodiment, the unified metadata file may be distributed by the broadcasting apparatus 214 to the plurality of distribution platforms 104*a*, . . . , 104*n* or external affiliates for individual networks via SCTE-224 message separately through a separate CDN network. In accordance with an embodiment, the unified metadata file may be distributed by the broadcasting apparatus 214 to the distribution platforms 104*a*, . . . , 104*n* or external affiliates as in-band data in the multiplexed linear media feed, via satellite communication network.

In accordance with an embodiment, the broadcasting apparatus 214 may transmit the unified package that are unencrypted and therefore free-to-air or free-to-view. In another example, the broadcasting apparatus 214 transmits the unified package with encryption (pay television), and thus requiring a subscription by the plurality of consumer devices 110a, . . . , 110n via the plurality of distribution platforms 104a, . . . , 104n. In such a case, the encryption may be based on CA or DRM technology, known in the art.

Figure 2B:
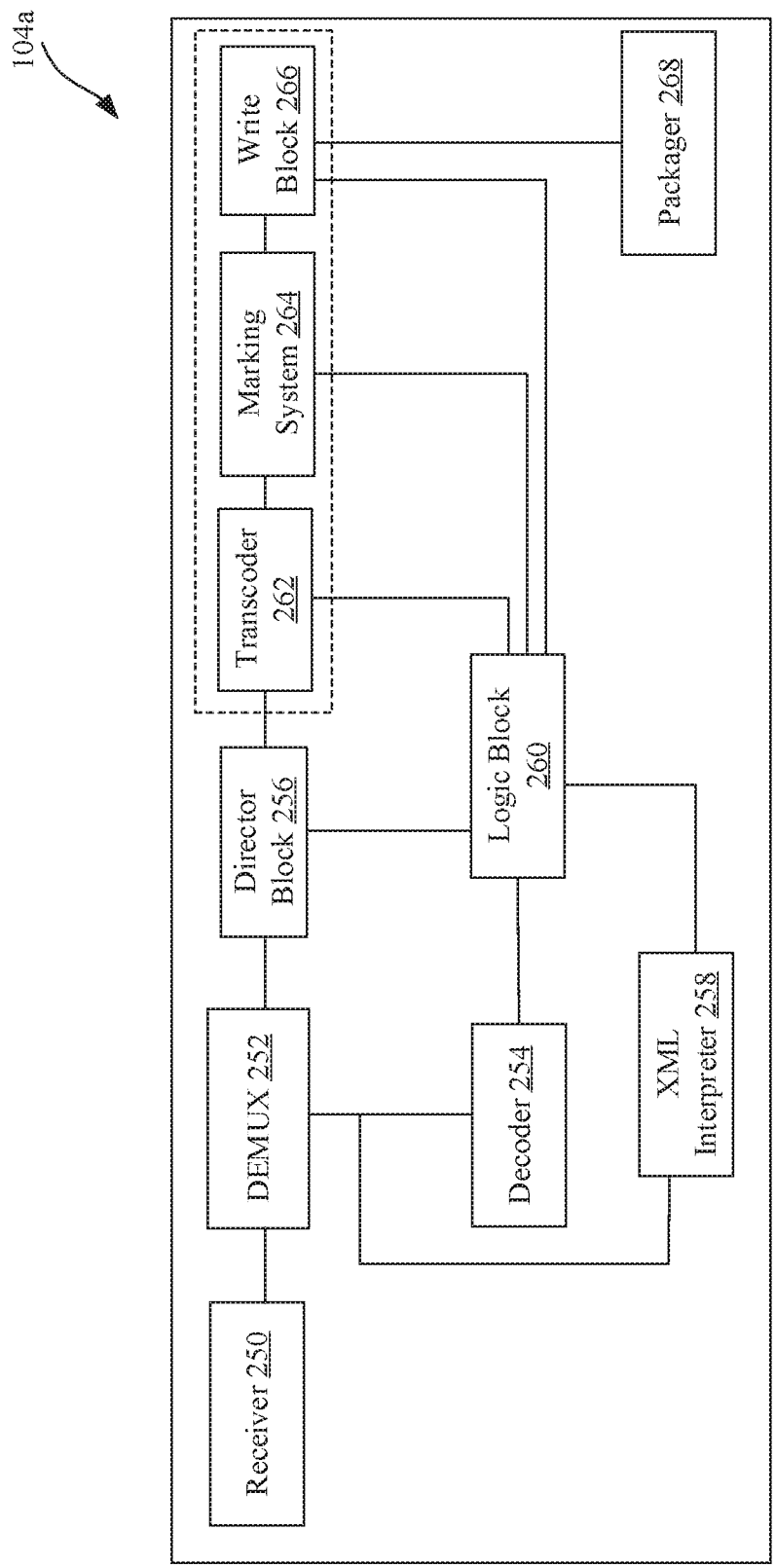
FIG. 2B is a block diagram that illustrates an exemplary distribution platform in an exemplary system for generating unified metadata for a plurality of distribution platforms, in accordance with an exemplary embodiment of the disclosure.

FIG. 2B is a block diagram that illustrates an exemplary distribution platform 104a from the plurality of distribution platforms 104a, . . . , 104n that receives unified package from the broadcast provider system 102, in accordance with an exemplary embodiment of the disclosure. Referring to FIG. 2B, the exemplary distribution platform 104a, comprises a receiver 250, a demultiplexer (DEMUX) 252, a director block 256, a decoder 254, an XML interpreter 258, a logic block 260, a transcoder 262, a marking system 264, a write block 266, and a packager 268, communicatively coupled with each other.

The receiver 250 may comprise suitable logic, circuitry, and interfaces that may be configured to execute code that receives the unified package, which comprises the broadcast media feed and the unified metadata file, from the broadcast provider system 102, via the communication network 120 (such as a satellite communication network), encrypted based on the CA and/or DRM technology.

The DEMUX 252 receives the broadcast media feed from the broadcast provider system 102 through the communication network 132. The broadcast media feed corresponds to a multiplexed linear media feed and comprises SCTE-35 and SCTE-224 messages. The DEMUX 252 demultiplexes the SCTE-35 message in the received multiplexed linear media feed into a plurality of programs (or packets) and generates the linear media feed. Each packet in the linear media feed may include a packet identifier (PID). One or more of the plurality of programs (or packets) may include information about the other packets. The DEMUX 252 further determines program-specific information (PSI) data which is metadata about the plurality of packets and a part of an MPEG TS of the linear media feed. The PSI data, as defined by ISO/IEC 13818-1, may include various tables, such as program association table, conditional access table, program map table, and network information table, required by the logic block 260.

Accordingly, the DEMUX 252 transmits the plurality of packets to the SCTE-35 decoder 254 and the director block 256. The SCTE-35 decoder 254 decodes the packets and identifies the plurality of triggers, such as program start, and transmits to the logic block 256. The DEMUX 252 further transmits the SCTE-224 message in the received linear media feed to the XML interpreter 258. The XML interpreter 258 receives the SCTE-224 message and parses the SCTE-224 message and provides parameters, such as airing identifier (i.e. airing_ID) to the logic block 260. The airing_ID links the file in the SCTE-224 message to the corresponding file in the queue of SCTE-35 message. The logic block 260 correlates the outputs of the SCTE-35 decoder 254 and XML interpreter 258, and determines what is to be recorded, requirement of the transcoding, Nielsen watermarks, and the like, associated with one or more presentation timestamps (PTS) of the packets. For example, the SCTE-35 message may indicate that the program start at timestamp 50,000. The director block 256, based on the PSI information may indicate that the audio of the audio-visual program is in a specific language, such as English or Spanish. The director block 256 may receive input from the logic block 260 regarding data associated with the SCTE-35 and SCTE-224 messages, and determines that the recording time is 50,000. The director block 256 transmits the SCTE-35 and further SCTE-36 and SCTE-39 messages to the transcoder 262. The director block 256 further trashes other packets which are not suitable to be transmitted to the transcoder 262.

The transcoder 262 may utilize the CableLabs® encoding profiles to transcode the input to an MPEG-2 TS and transmit the stream to the marking system 264. The marking system 264 may include specific watermarks, such as Nielson SID/TIC, and forward the watermarked stream to the write block 266. The Nielson SID/TIC may indicate that the stream corresponds to a VOD asset comprising attributes like fast forward, and disable. The write block 266 may write or store the watermarked stream to the nDVR storage with corresponding metadata. The watermarked stream may be utilized by the packager 130 thereafter to generate ADI package based on which the one or more VOD content assets are dynamically generated for a customer device. Similar steps, as stated above, may be performed by the integrated system to write other watermarked streams corresponding to other SCTE-35 message.

The packager 268 may comprise suitable logic, circuitry, and interfaces that may be configured to execute code to determine a package that includes media content and associated metadata. The media content may correspond to one or more of the plurality of segments transcoded to different types of streams for different types of devices, such as a TV or a mobile device, and marked with Nielson markers. Based on such a package, one or more pre-encoded content assets are dynamically generated for one or more of the plurality of consumer devices 110a, . . . , 110n. In an embodiment, the packager 268 may be configured to publish the one or more pre-encoded content assets in real-time or near real-time. For example, the packager 268 may be operable to create "C3" content assets and clips that may be made available before content roles out of the distribution platform 104a. The packager 268 may also be configured to provide near-real time redundancy. The resulting converted output, i.e. one or more pre-encoded content assets, that is generated by the packager 268 may be communicated to one or more of the plurality of consumer devices 110a, . . . , 110n. The packager 268 may also support a robust interface (e.g. ADI) that defines the on-demand duration of the individual segments as well as encryption requirements and a service type to link for ad insertion.

In operation, the distribution platform 104a may be configured to receive the unified package comprising the broadcast media feed, the plurality of triggers as SCTE-35 message, and the unified metadata file from a broadcast source, such as the broadcasting apparatus 214 of the broadcast provider system 102, over a communication network, such as the communication network 120. In an embodiment, the unified package comprising the broadcast media feed, the plurality of triggers, and the unified metadata file may be encrypted based on the CA and/or DRM technology.

As described herein, the receiver 250 of the distribution platform 104a may receive the unified package from the broadcast provider system 102, via the communication network 120. Similarly, receivers of the other distribution platforms 104b, . . . , 104n may also be configured to receive the unified package comprising the broadcast media feed and the plurality of triggers as SCTE-35 message, and the unified metadata file from the broadcast provider system 102, over the communication network 132. For brevity, the functionality of only one distribution platform 104*a* is explained hereinafter. Notwithstanding, the functionality of the remaining ones of the plurality of distribution platforms 104*b*, . . . , 104*n* is similar to the functionality of the distribution platform 104*a*, without any deviation from the scope of the disclosure.

In accordance with an embodiment, the DEMUX 252 may be configured to identify the encoded plurality of segments of linear media feed with the plurality of triggers and the unified metadata file from the received unified package. The DEMUX 252 demultiplexes the SCTE-35 message in the received broadcast media feed (which is multiplexed linear media feed) into a plurality of programs (or packets) and generates the corresponding encoded linear media feed. The DEMUX 252 transmits the encoded linear media feed to the SCTE-35 decoder 254 and the director block 256. The DEMUX 252 further transmits the unified metadata file (i.e. the SCTE-224 message) to the XML interpreter 258.

The XML interpreter 258 may be configured to parse the universal schema of the plurality of category nodes and attributes in the unified metadata file based on at least the ADI specification required by the distribution platform 104*a*. The XML interpreter 258 parses the unified metadata file and provides parameters, such as airing identifier (i.e. airing_ID) to the logic block 260. The airing_ID links the unified metadata file to the corresponding file in the queue of SCTE-35 message.

The logic block 260 may be configured to correlate the outputs of the SCTE-35 decoder 254 and the XML interpreter 258. Accordingly, the logic block 260 determines what is to be recorded, requirement of the transcoding, Nielsen watermarks, and the like, associated with one or more PTS of the packets. For example, the SCTE-35 message may indicate that the program starts at timestamp 50,000. The director block 256, based on the PSI information may indicate that the audio of the audio-visual program is in a specific language, such as English or Spanish. The director block 256 may receive input from the logic block 260 regarding data associated with the SCTE-35 and SCTE-224 messages, and determines that the recording time is 50,000. The director block 256 transmits the SCTE-35 and further SCTE-36 and SCTE-39 messages to the transcoder 262. The director block 256 further trashes the packets, that is not in accordance with the ADI specification of the corresponding distribution platform 104*a*.

The transcoder 262 may utilize the CableLabs® encoding profiles to transcode the input to an MPEG-2 TS, and transmit the stream to the marking system 264. The marking system 264 may include specific watermarks, such as Nielson SID/TIC, and forward the watermarked stream to the write block 266. The write block 266 may write or store the watermarked stream to a local storage, such as the nDVR storage, with corresponding metadata.

Thereafter, the packager 268 may generate a transport stream package, such as ADI package, that includes at least the transport stream in accordance with the ADI specification required by the distribution platform 104*a*. In accordance with an embodiment, the packager 268 may be configured to store the transport stream that includes the one or more watermarks with corresponding metadata, wherein the corresponding metadata is a subset of the unified metadata in accordance with the ADI specification required by the distribution platform 104*a*.

In accordance with an embodiment, the packager 268 may be configured to transmit the transport stream package to one or more subscribed consumer devices, such as the consumer devices 110*a* . . . 110*n* through the communication network, such as the communication network 120.

Figure 4A:
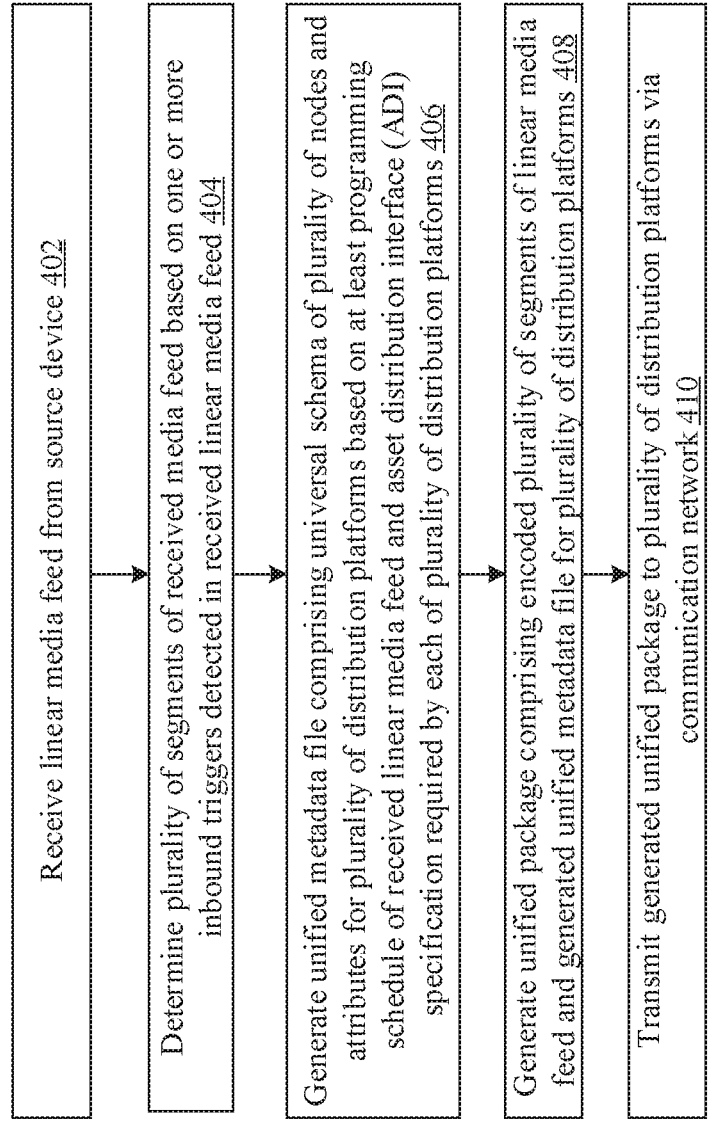
FIG. 4A depicts a flow chart illustrating high-level operation of an exemplary broadcast provider system of FIGS. 1 and 2A, in accordance with an exemplary embodiment of the disclosure.

FIG. 4A depicts a flow chart illustrating high-level operation of an exemplary broadcast provider system 102 of FIG. 1, in accordance with an exemplary embodiment of the disclosure. Referring to FIG. 4A, there is shown a flow chart 400A comprising exemplary operations 402 through 410.

At 402, linear media feed may be received from the source device 106. In accordance with an embodiment, the broadcast provider system 102 may be configured to receive the linear media feed from the source device 106. The scheduler 114 in the broadcast provider system 102 may be configured to receive a specific schedule, which corresponds to the linear media feed of a channel broadcasted to the plurality of distribution platforms 104*a*, . . . , 104*n*, from the source device 106, which may be, for example a D4 schedule source. The specific schedule may include one or more scheduling rules that correspond to the linear media feed of the channel broadcasted to the distribution platforms 104*a*, . . . , 104*n*. Examples of such one or more scheduling rules may include, but are not limited to, sanitization of the received linear media feed of the channel, insertion of a discontinuities between program segments in the linear media feed, ordering of the program segments in the linear media feed, insertion of a unique source identifiers, such as Nielson SID/TIC, time in content in the linear media feed, insertion of new promotional content, specific to the broadcast provider system 102 in the linear media feed, along with programing content, and a time when to deliver the linear media feed. The SID corresponds to source identification that uniquely identifies the broadcast provider system 102. The TIC corresponds to time in content which is a serial number that is watermarked onto VOD content every four seconds to uniquely identify the program.

The linear media feed may correspond to a linear stream of multimedia frames of programming content provided by a content source, such as the source device 106. The linear media feed may correspond to an uncompressed SDI video and may be embedded with the ancillary data, such as the close caption data, format definition data, VITC, and/or the like in the broadcast chain system 118. In various embodiments, the linear media feed is at least one of a live video feed or a pre-stored media feed.

At 404, a plurality of segments of the received linear media feed may be determined based on one or more inbound triggers detected in the received linear media feed. In accordance with an embodiment, the broadcast chain system 118 may be configured to determine the plurality of segments of the received linear media feed based on the one or more inbound triggers associated with the received linear media feed. Based on the determined plurality of segments of the received linear media feed, one or more spots may be determined, where non-programming content may be inserted. In certain embodiments, the one or more spots may be utilized for inserting other desired content, for example based on a geographical region associated with the distribution platform 104*a*.

At 406, unified metadata file comprising universal schema of a plurality of category nodes and attributes may be generated for the plurality of distribution platforms 104*a*, . . . , 104*n*. The unified metadata file may be generated based on at least programming schedule of received linear media feed and an ADI specification required by each of plurality of distribution platforms 104*a*, . . . , 104*n*. In accordance with an embodiment, the unified metadata file generator 210 may be configured to generate the unified metadata comprising the universal schema of the plurality of category nodes and attributes for the plurality of distribution platforms 104*a*, . . . , 104*n*. The unified metadata file generator 210 may be configured to generate and update the unified metadata in real-time.

The unified metadata may include at least one of a media item identifier of the linear media feed, a title of the linear media feed, a short summary of the plurality of segments, a file format, encryption information, timing information associated with one or more commercial breaks, a schedule to play non-programming content, such as one or more advertisements and/or promotional content, within programming content of the linear media feed, length of the linear media feed, a date and/or time the linear media feed was added to a catalog of media items, a new item indicator for the linear media feed, a media item class, a sequence of the plurality of attributes defined with respect to a corresponding node of the plurality of category nodes, and PSI data, and closed captioning data.

In accordance with an embodiment, the graphics server 202 may be configured to receive on-screen view of the plurality of segments from the content storage system 116 and insert a plurality of graphics on the on-screen view of the plurality of segments. The plurality of graphics may be inserted on the on-screen view based on the time-based parameter and/or the region-based parameter specified in the programming schedule. Thereafter, the CC server 204 may be configured to insert closed caption, for example, subtitles, on the on-screen view of the plurality of segments. Further, the Nielsen system 206 may append watermarks to audio content and/or video content associated with the on-screen view of the plurality of segments. Such Nielsen watermarks may be used to track the linear broadcast's audience. Also, the OATC/SCTE system 208 may be configured to handle insertion of SCTE 104/35, a plurality of cues or triggers in the plurality of segments of the linear media feed. Accordingly, the plurality of segments of the linear media feed with triggers may correspond to SCTE-104-inserted message. The SCTE-104-based digital ad-marker may be inserted in the SDI video as vertical ancillary (VANC) data. The SCTE-104 is in 10-bit hexadecimal format so as to match data words in the uncompressed SDI video. Various examples of such plurality of cues or triggers may be splice points, such as program start, program end, content placement opportunity start/end, commercial break start, commercial break end, promotional content start, promotional content end, advertisement start/end, and the like.

At 408, a unified package comprising encoded plurality of segments of the linear media feed may be generated. The unified package may comprise the generated unified metadata file for the plurality of distribution platforms 104*a*, . . . , 104*n*. In accordance with an embodiment, the media content packager 212 may be configured to generate the unified package comprising encoded plurality of segments of the linear media feed and the generated unified metadata file for the plurality of distribution platforms 104*a*, . . . , 104*n*. The media content packager 212 may be configured to control encoding, multiplexing and packaging of the programming content (that corresponds to plurality of segments of the linear media feed) and the non-programming content with the unified metadata. Specifically, one or more encoders in the media content packager 212 may be configured to receive the plurality of segments of the linear media feed with a plurality of triggers (as SCTE-104—inserted message) from the OATC/SCTE system 208. The MUX may be configured to receive the encoded linear media feed with the plurality of triggers (as SCTE-35-based message) and multiplex with the unified metadata (as SCTE-224 message) related to the encoded linear media feed with the plurality of triggers, in conjunction with the data embedding system. The data embedding system may be configured to execute code that may receive the unified metadata from the content storage system 116 and transmit it to the MUX where the unified metadata is multiplexed as SCTE-224 message with the encoded linear media feed with the plurality of triggers. The media content packager 212 may thus convert the MPEG2 TS of the linear media feed to one or more output formats (for example, various HTTP formats, such as HLS, protected HLS, Smooth Streams, and DASH) based on, for example, bitrate of a target computing device.

At 410, the generated unified package may be transmitted to the plurality of distribution platforms 104*a*, . . . , 104*n* via a communication network, such as the communication network 120. In accordance with an embodiment, the broadcasting apparatus 214 may be configured to transmit (or broadcast) an electromagnetic signal corresponding to the unified package in the one or more output formats to the plurality of distribution platforms 104*a*, . . . , 104*n*. In an example, the broadcasting apparatus 214 transmits the unified package that are unencrypted and therefore free-to-air or free-to-view. In another example, the broadcasting apparatus 214 transmits the unified package with encryption (pay television), and thus requiring a subscription by the plurality of consumer devices 110*a*, . . . , 110*n* via the plurality of distribution platforms 104*a*, . . . , 104*n*. In such a case, the encryption may be based on CA or DRM technology, known in the art.

In accordance with an embodiment, the unified metadata may be distributed by the broadcasting apparatus 214 to the plurality of distribution platforms 104*a*, . . . , 104*n* or external affiliates for individual networks via SCTE-224 message separately through a separate CDN network. In accordance with an embodiment, the unified metadata may be distributed by the broadcasting apparatus 214 to the distribution platforms 104*a*, . . . , 104*n* or external affiliates as in-band data in the multiplexed linear media feed, via satellite communication network.

Figure 4B:
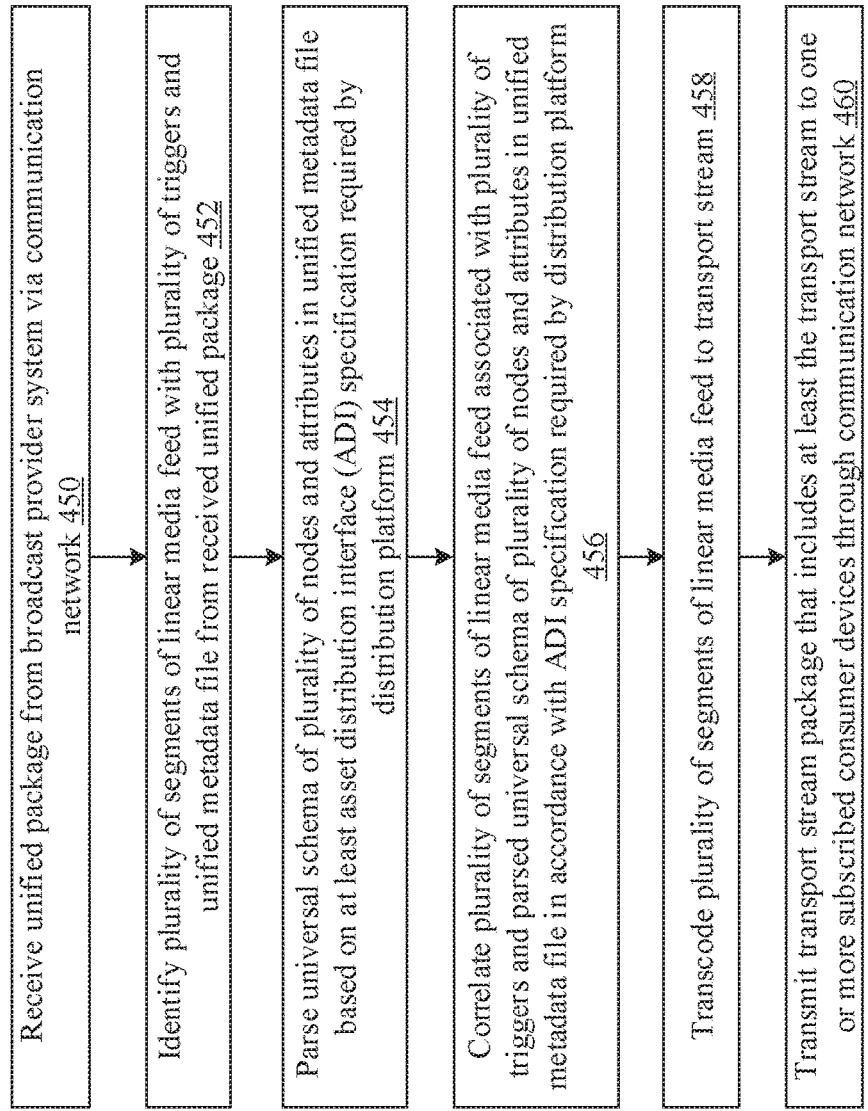
FIG. 4B depicts a flow chart illustrating high-level operation of an exemplary distribution platform of FIGS. 1 and 2B, in accordance with an exemplary embodiment of the disclosure.

FIG. 4B depicts a flow chart illustrating high-level operation of an exemplary distribution platform 104*a* of FIG. 1, in accordance with an exemplary embodiment of the disclosure. Referring to FIG. 4B, there is shown a flow chart 400B comprising exemplary operations 450 through 460.

At 450, a unified package may be received from the broadcast provider system 102 via a communication network, such as the communication network 120. The unified package may comprise the plurality of segments of media feed with the plurality of triggers, and the unified metadata. In accordance with an embodiment, the receiver 250 in the distribution platform 104*a* may be configured to receive the unified package, which comprises the broadcast media feed and the unified metadata, from the broadcast provider system 102, via the communication network 120 (such as a satellite communication network), encrypted based on the CA and/or DRM technology.

At 452, the plurality of segments of the linear media feed with the plurality of triggers and the unified metadata may be identified from the received unified package. In accordance with an embodiment, the DEMUX 252 may be configured to identify the plurality of segments of linear media feed with the plurality of triggers and the unified metadata from the received unified package. The DEMUX 252 demultiplexes the SCTE-35 message in the received multiplexed linear media feed into a plurality of programs (or packets) and generates the linear media feed. The DEMUX 252 transmits the plurality of packets to the SCTE-35 decoder 254 and the director block 256. The DEMUX 252 further transmits the unified metadata file to the XML interpreter 258.

At 454, a universal schema of a plurality of category nodes and attributes in the unified metadata file may be parsed based on at least the ADI specification required by the distribution platform 104a. In accordance with an embodiment, the XML interpreter 258 may be configured to parse the universal schema of the plurality of category nodes and attributes in the unified metadata file based on at least the ADI specification required by the distribution platform 104a. The XML interpreter 258 parses the unified metadata file and provides parameters, such as airing identifier (i.e. airing_ID) to the logic block 260. The airing_ID links the unified metadata file to the corresponding file in the queue of SCTE-35 message.

At 456, the plurality of segments of linear media feed associated with the plurality of triggers and the parsed universal schema of the plurality of category nodes and attributes in the unified metadata file may be correlated in accordance with the ADI specification required by the distribution platform 104a. In accordance with an embodiment, the logic block 260 may be configured to correlate the outputs of the SCTE-35 decoder 254 and the XML interpreter 258. Accordingly, the logic block 260 determines what is to be recorded, requirement of the transcoding, Nielsen watermarks, and the like, associated with one or more PTS of the packets. For example, the SCTE-35 message may indicate that the program start at timestamp 50,000. The director block 256, based on the PSI information may indicate that the audio of the audio-visual program is in a specific language, such as English or Spanish. The director block 256 may receive input from the logic block 260 regarding data associated with the SCTE-35 and SCTE-224 messages, and determines that the recording time is 50,000. The director block 256 transmits the SCTE-35 and further SCTE-36 and SCTE-39 messages to the transcoder 262. The director block 256 further trashes the packets, that is not in accordance with the ADI specification of the corresponding distribution platform 104a.

At 458, the plurality of segments of the linear media feed may be transcoded to a transport stream. In accordance with an embodiment, the transcoder 262 may be configured to transcode the plurality of segments of the linear media feed to a transport stream. The transcoder 262 may utilize the CableLabs® encoding profiles to transcode the input to an MPEG-2 TS, and transmit the stream to the marking system 264. The marking system 264 may include specific watermarks, such as Nielson SID/TIC, and forward the watermarked stream to the write block 266. The Nielson SID/TIC may indicate that the stream corresponds to a VOD asset comprising attributes like fast forward, and disable. The write block 266 may write or store the watermarked stream to the nDVR storage with corresponding metadata.

At 460, a transport stream package that includes at least the transport stream may be transmitted to one or more subscribed consumer devices, such as the consumer devices 110a . . . 110n through the communication network, such as the communication network 120. In accordance with an embodiment, the packager 268 may be configured to generate a transport stream package, such as ADI package, that includes at least the transport stream in accordance with the ADI specification required by the distribution platform 104a. In accordance with an embodiment, the packager 268 may be configured to store the transport stream that includes the one or more watermarks with corresponding metadata, wherein the corresponding metadata is a subset of the unified metadata file in accordance with the ADI specification required by the distribution platform 104a.

In accordance with an embodiment, the packager 268 may be configured to re-package the plurality of segments of the linear media feed and corresponding unified metadata based on one or more modifications required within the unified metadata file.

In accordance with an embodiment, the packager 268 may be configured to transmit the transport stream package to one or more subscribed consumer devices, such as the consumer devices 110a . . . 110n through the communication network, such as the communication network 120.

Figure 5A:
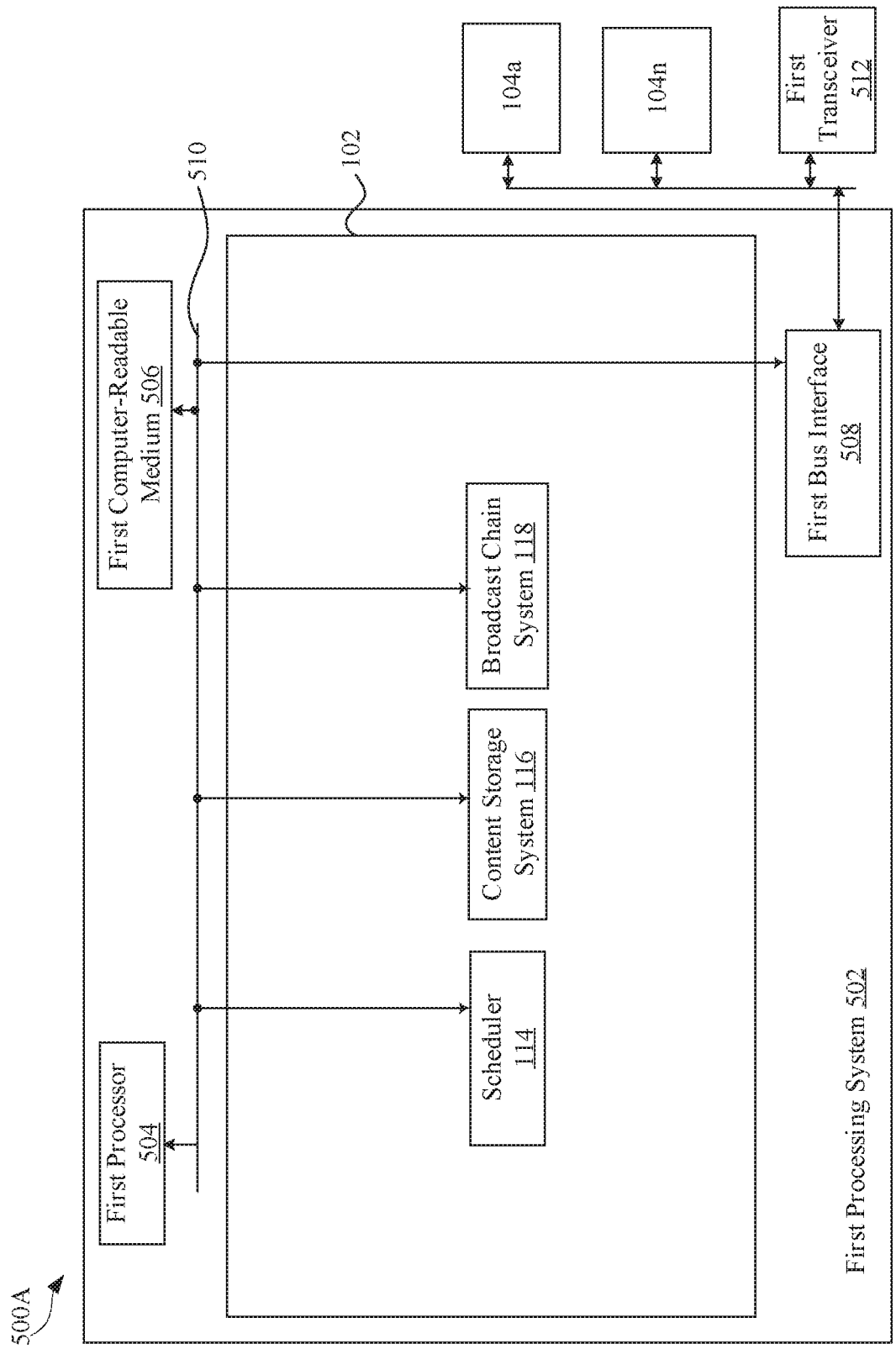
FIG. 5A is a conceptual diagram illustrating an example of a hardware implementation for a broadcast provider system employing a processing system for generating unified metadata for a plurality of distribution platforms, in accordance with an exemplary embodiment of the disclosure.

FIG. 5A is a conceptual diagram illustrating an example of a hardware implementation for a broadcast provider system employing a processing system for generating unified metadata for a plurality of distribution platforms, in accordance with an exemplary embodiment of the disclosure. Referring to FIG. 5A, the hardware implementation shown by a representation 500A for the exemplary system 100 employs a first processing system 502 for generating unified metadata for a plurality of distribution platforms, in accordance with an exemplary embodiment of the disclosure, as described herein.

In some examples, the first processing system 502 may comprise one or more first hardware processors 504, a first non-transitory computer-readable medium 506, a first bus 508, a first bus interface 510, and a first transceiver 512. FIG. 5A further illustrates the scheduler 114, the content storage system 116, and the broadcast chain system 118, as described in detail in FIG.

The first hardware processor 504 may be configured to manage the first bus 508 and general processing, including the execution of a set of instructions stored on the first non-transitory computer-readable medium 506. The set of instructions, when executed by the first hardware processor 504, causes the exemplary system 100 to execute the various functions described herein for any particular apparatus. The first hardware processor 504 may be implemented, based on a number of processor technologies known in the art. Examples of the first hardware processor 504 may be a Reduced Instruction Set Computing (RISC) processor, an Application-Specific Integrated Circuit (ASIC) processor, a Complex Instruction Set Computing (CISC) processor, and/or other processors or control circuits.

The first non-transitory computer-readable medium 506 may be used for storing data that is manipulated by the first hardware processor 504 when executing the set of instructions. The data is stored for short periods or in the presence of power. The first non-transitory computer-readable medium 506 may also be configured to store data for the scheduler 114, the content storage system 116, and the broadcast chain system 118.

The first bus 508 is configured to link together various circuits. In this example, the exemplary system 100 employing the first processing system 502 and the first non-transitory computer-readable medium 506 may be implemented with bus architecture, represented generally by the first bus 508. The first bus 508 may include any number of interconnecting buses and bridges depending on the specific implementation of the exemplary system 100 and the overall design constraints. The first bus interface 510 may be configured to provide an interface between the first bus 508 and other circuits, such as, the first transceiver 512, and external devices, such as the plurality of distribution platforms 104a, . . . , 104n.

The first transceiver 512 may be configured to provide a communication of the communication network 120 with various other apparatus, such as the plurality of distribution platforms 104a, . . . , 104n, via the communication network 120. The first transceiver 512 may communicate via wireless communication with networks, such as the Internet, the Intranet and/or a wireless network, such as a cellular telephone network, a wireless local area communication network (WLAN) and/or a metropolitan area communication network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX.

It should be recognized that, in some embodiments of the disclosure, one or more components of FIG. 5A may include software whose corresponding code may be executed by at least one processor, for across multiple processing environments. For example, the scheduler 114, the content storage system 116, and the broadcast chain system 118, may include software that may be executed across a single or multiple processing environments.

In an aspect of the disclosure, the first hardware processor 504, the first non-transitory computer-readable medium 506, or a combination of both may be configured or otherwise specially programmed to execute the operations or functionality of the scheduler 114, the content storage system 116, and the broadcast chain system 118, or various other components described herein, as described with respect to FIGS. 1 and 2A.

Figure 5B:
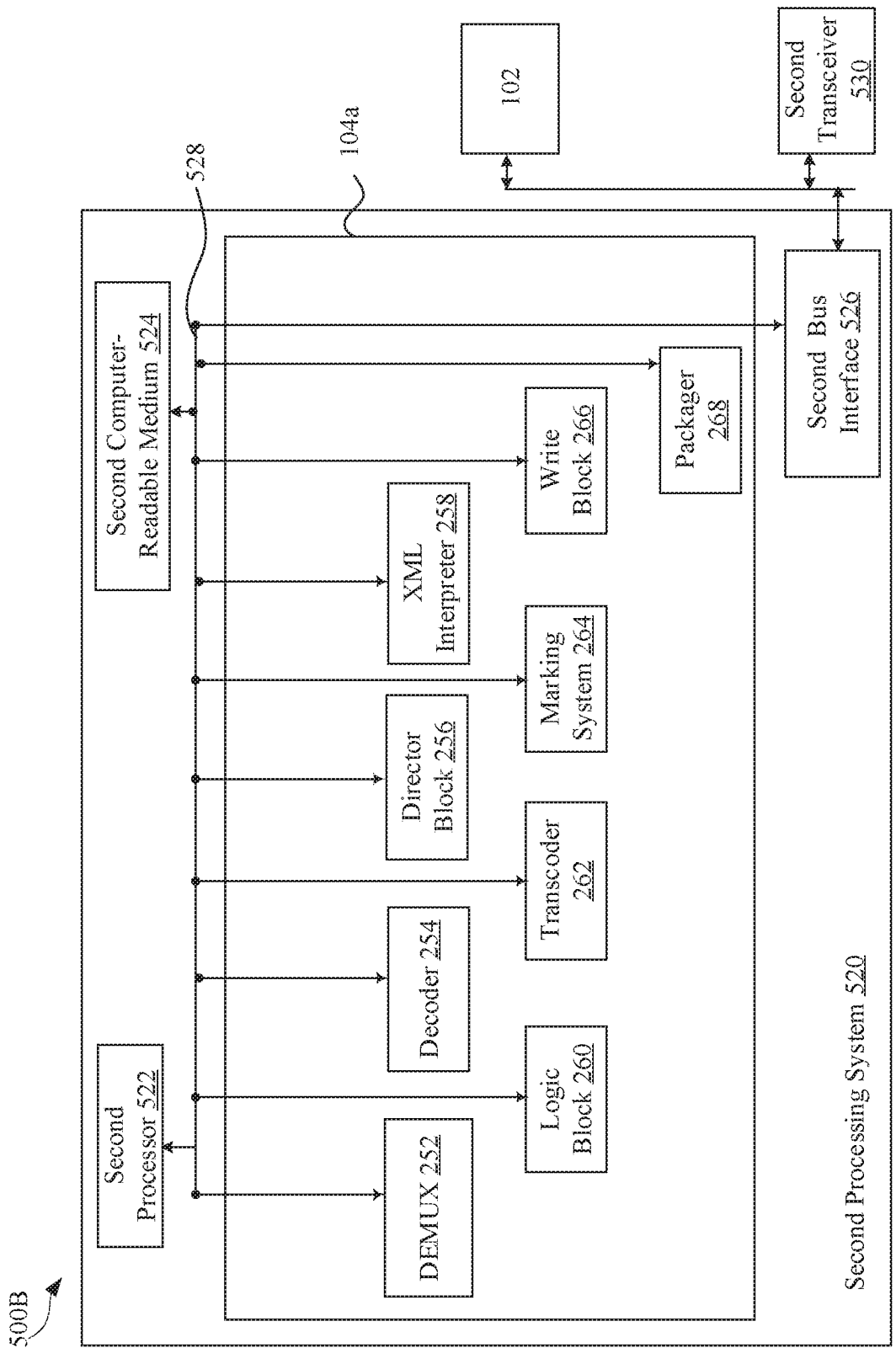
FIG. 5B is a conceptual diagram illustrating an example of a hardware implementation for a distribution platform employing a processing system for receiving unified package, in accordance with an exemplary embodiment of the disclosure.

FIG. 5B is a conceptual diagram illustrating an example of a hardware implementation for a distribution platform employing a processing system for receiving unified package, in accordance with an exemplary embodiment of the disclosure. Referring to FIG. 5B, the hardware implementation shown by a representation 500B for the exemplary system 100 employs a second processing system 520 for generating unified metadata for a plurality of distribution platforms, in accordance with an exemplary embodiment of the disclosure, as described herein.

In some examples, the second processing system 520 may comprise one or more second hardware processors 522, a second non-transitory computer-readable medium 524, a second bus 526, a second bus interface 528, and a second transceiver 530. FIG. 5B further illustrates the receiver 250, the DEMUX 252, the director block 256, the decoder 254, the XML interpreter 258, the logic block 260, the transcoder 262, the marking system 264, the write block 266, and the packager 268, as described in detail in FIG. 2B.

The second hardware processor 522 may be configured to manage the second bus 526 and general processing, including the execution of a set of instructions stored on the second non-transitory computer-readable medium 524. The set of instructions, when executed by the second hardware processor 522, causes the exemplary system 100 to execute the various functions described herein for any particular apparatus. The second hardware processor 522 may be implemented, based on a number of processor technologies known in the art. Examples of the second hardware processor 522 may be a RISC processor, an ASIC processor, a CISC processor, and/or other processors or control circuits.

The second non-transitory computer-readable medium 524 may be used for storing data that is manipulated by the second hardware processor 522 when executing the set of instructions. The data is stored for short periods or in the presence of power. The second non-transitory computer-readable medium 524 may also be configured to store data for the receiver 250, the DEMUX 252, the director block 256, the decoder 254, the XML interpreter 258, the logic block 260, the transcoder 262, the marking system 264, the write block 266, and the packager 268, as described in detail in FIG. 2B.

The second bus 526 is configured to link together various circuits. In this example, the exemplary system 100 employing the second processing system 520 and the second non-transitory computer-readable medium 524 may be implemented with bus architecture, represented generally by the second bus 526. The second bus 526 may include any number of interconnecting buses and bridges depending on the specific implementation of the exemplary system 100 and the overall design constraints. The second bus interface 528 may be configured to provide an interface between the second bus 526 and other circuits, such as, the second transceiver 530, and external devices, such as the plurality of distribution platforms 104a, . . . , 104n.

The second transceiver 530 may be configured to provide a communication of the communication network 120 with various other apparatus, such as the plurality of distribution platforms 104a, . . . , 104n, via the communication network 120. The second transceiver 530 may communicate via wireless communication with networks, such as the Internet, the Intranet and/or a wireless network, such as a cellular telephone network, a wireless local area communication network (WLAN) and/or a metropolitan area communication network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX.

It should be recognized that, in some embodiments of the disclosure, one or more components of FIG. 5B may include software whose corresponding code may be executed by at least one processor, for across multiple processing environments. For example, the receiver 250, the DEMUX 252, the director block 256, the decoder 254, the XML interpreter 258, the logic block 260, the transcoder 262, the marking system 264, the write block 266, and the packager 268, as described in detail in FIG. 2B, may include software that may be executed across a single or multiple processing environments.

In an aspect of the disclosure, the second hardware processor 522, the second non-transitory computer-readable medium 524, or a combination of both may be configured or otherwise specially programmed to execute the operations or functionality of the receiver 250, the DEMUX 252, the director block 256, the decoder 254, the XML interpreter 258, the logic block 260, the transcoder 262, the marking system 264, the write block 266, and the packager 268, as described in detail in FIG. 2B, or various other components described herein, as described with respect to FIGS. 1 and 2A.

Various embodiments of the disclosure comprise a broadcast provider, such as the broadcast provider system 102, which may include one or more processors configured to receive the linear media feed from the source device 106. The one or more processors, such as the broadcast chain system 118, may be configured to determine the plurality of segments of the received linear media feed based on the one or more inbound triggers associated with the received linear media feed. The one or more processors, such as the unified metadata file generator 210 may be configured to generate the unified metadata file comprising the universal schema of the plurality of category nodes and attributes for the plurality of distribution platforms 104a, . . . , 104n based on at least a programming schedule of the received linear media feed and the ADI specification required by each of the plurality of distribution platforms 104a, . . . , 104n. The one or more processors, such as the media content packager 212 may be configured to generate a unified package comprising the plurality of segments of the linear media feed as a broadcast media feed and the generated unified metadata file for the plurality of distribution platforms 104a, . . . , 104n. The one or more processors, such as the broadcasting apparatus 214 may be configured to transmit the generated unified package to the plurality of distribution platforms 104a, . . . , 104n via a communication network, such as the communication network 120.

Various embodiments of the disclosure comprise a distribution platform, such as the distribution platform 104a, which may include one or more processors, such as the receiver 250, configured to receive the unified package from the broadcast provider system via the communication network 120. The unified package may comprise the plurality of segments of broadcast media feed with the plurality of triggers, and the unified metadata file. The one or more processors, such as the DEMUX 252, may be configured to identify the plurality of segments of the broadcast media feed with the plurality of triggers and the unified metadata file from the received unified package. The one or more processors, such as the XML interpreter 258, may be configured to parse the universal schema of the plurality of category nodes and attributes in the unified metadata file based on at least the ADI specification required by the distribution platform 104a. The one or more processors, such as the logic block 260, correlates the plurality of segments of the broadcast media feed associated with the plurality of triggers and the parsed universal schema of the plurality of category nodes and attributes in the unified metadata file in accordance with the ADI specification required by the distribution platform. The one or more processors, such as the transcoder 262, may be configured to transcode the plurality of segments of the broadcast media feed to a transport stream. The one or more processors, such as the packager 268, may be configured to generate a transport stream package that includes at least the transport stream and transits the transport stream package to one or more subscribed consumer devices, such as one or more of the plurality of consumer devices 110a, . . . , 110n, through the communication network 120.

Various embodiments of the disclosure may provide a non-transitory computer-readable medium having stored thereon, computer implemented instruction that when executed by a processor causes a broadcast provider, such as the broadcast provider system 102, to receive a linear media feed from the source device 106, and determine a plurality of segments of the received linear media feed based on one or more inbound triggers associated with the received linear media feed. The processor further causes the broadcast provider system 102 to generate a unified metadata file comprising a universal schema of a plurality of category nodes and attributes for a plurality of distribution platforms 104a, . . . , 104n based on at least a programming schedule of the received linear media feed and the ADI specification required by each of the plurality of distribution platforms 104a, . . . , 104n. The processor further causes the broadcast provider system 102 to generate a unified package comprising the plurality of segments of the linear media feed as a broadcast media feed and the generated unified metadata file for the plurality of distribution platforms 104a, . . . , 104n. The processor further causes the broadcast provider system 102 to transmit the generated unified package to the plurality of distribution platforms 104a, . . . , 104n via a communication network, such as the communication network 120.

Various embodiments of the disclosure may provide a non-transitory computer-readable medium having stored thereon, computer implemented instruction that when executed by a processor causes a distribution platform, such as the distribution platform 104a, to receive the unified package from the broadcast provider system via the communication network 120. The unified package may comprise the plurality of segments of broadcast media feed with the plurality of triggers, and the unified metadata file. The processor may cause the distribution platform 104a to identify the plurality of segments of the broadcast media feed with the plurality of triggers and the unified metadata file from the received unified package. The processor may cause the distribution platform 104a to parse the universal schema of the plurality of category nodes and attributes in the unified metadata file based on at least the ADI specification required by the distribution platform 104a. The processor may cause the distribution platform 104a to correlate the plurality of segments of the broadcast media feed associated with the plurality of triggers and the parsed universal schema of the plurality of category nodes and attributes in the unified metadata file in accordance with the ADI specification required by the distribution platform. The processor may cause the distribution platform 104a to transcode the plurality of segments of the broadcast media feed to a transport stream. The processor may cause the distribution platform 104a to generate a transport stream package that includes at least the transport stream and transits the transport stream package to one or more subscribed consumer devices, such as one or more of the plurality of consumer devices 110a, . . . , 110n, through the communication network 120.

The proposed method and system for generating unified metadata provides various advantages over the existing systems. As in the existing systems, for each media content delivered to a distribution platform, the broadcasting platform associates a metadata file with the media content customized for corresponding distribution platform. The reason for such customization of the metadata file may be that each distribution platform has its own ADI specification—CableLabs® 1.1 specification. An ADI specification for a distributed platform may be different from the standard specification in a manner that either the standard specification is violated, or certain rules or syntax are added that are originally not there in the standard specification.

Once the media content is received, the distribution platforms further delivers the media content to subscribed viewers. Thus, in existing systems, there may be required an installation of substantial infrastructure and availability of multiple resources for delivering a customized metadata associated with media content to each distributed platform. This may eventually increase overall operating and maintaining cost of the content provider.

The proposed method and system facilitate the generation of a unified metadata and a unified package that is very low in complexity and doesn't require an installation of a substantial infrastructure and/or multiple resources. Thus, overall operating and maintaining cost of the content provider is substantially decreased. The proposed method and system provides various enhancements. For example, the broadcast provider system 102 may add a license window end and start in the unified metadata file to facilitate providing different data to each distribution platform of the plurality of distribution platforms 104a, . . . , 104n, based on date/timestamp structure. Further, the broadcast provider system 102 may be configured to add alternate license windows so that the unified metadata file covers both "D4" and "D1" assets. The alternate license windows enable the same asset and same metadata for the replacement of "D4" asset with "D1" asset. The broadcast provider system 102 may be configured to support different raster sizes for multiple images on different distribution platforms to modify image and orientation in accordance with the requirement of the consumer devices, such as mobile devices or web-based platforms. The broadcast provider system 102 may be further configured to support language enhancements on primary, secondary, and tertiary tracks by providing a better way to communicate the media content that is much more meaningful for the affiliates.

The word "exemplary" is used herein to mean "serving as an example, instance, or illustration." Any embodiment described herein as "exemplary" is not necessarily to be construed as preferred or advantageous over other embodiments. Likewise, the term "embodiments of the disclosure" does not require that all embodiments of the disclosure include the discussed feature, advantage or mode of operation.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for creation of channel to support legacy video-on-demand systems.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present disclosure has been described with reference to certain embodiments, it will be noted understood by, for example, those skilled in the art that various changes and modification could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
    a memory for storing instructions;
    one or more processors in a broadcast provider system, the one or more processors are configured to execute the instructions, based on the instructions, the one or more processors are configured to:
        determine a plurality of segments of a linear media feed based on one or more inbound triggers associated with the linear media feed;
        generate a unified metadata file that corresponds to a universal schema to share with a plurality of distribution platforms,
            wherein the generated unified metadata file comprises a plurality of category nodes with associated attributes for each distribution platform of the plurality of distribution platforms, and
            wherein the associated attributes are included in the unified metadata file based on at least a programming schedule of the linear media feed and an asset distribution interface (ADI) specification required by each of the plurality of distribution platforms;
        insert alternate license windows in the unified metadata file for enabling same asset and same metadata for a replacement of a first asset with a second asset;
        generate a unified package comprising the plurality of segments of the linear media feed as a broadcast media feed and the generated unified metadata file; and
        transmit the generated unified package to each distribution platform of the plurality of distribution platforms via a communication network.

2. The system according to claim 1, wherein the linear media feed is at least one of a live video feed or a pre-stored media feed.

3. The system according to claim 1, wherein the unified metadata file includes at least one of a media item identifier of the linear media feed, a title of the linear media feed, a short summary of the plurality of segments, a file format, encryption information, length of the linear media feed, a date and/or time the linear media feed was added to a catalog of media items, a new item indicator for the linear media feed, a media item class, a sequence of a plurality of attributes defined with respect to a corresponding node of the plurality of category nodes, and program-specific information (PSI) data, and closed captioning data.

4. The system according to claim 1, wherein the one or more processors are further configured to generate and update the unified metadata file in real-time.

5. The system according to claim 1, wherein the plurality of segments of the linear media feed and corresponding unified metadata are re-packaged by one or more of the plurality of distribution platforms based on one or more modifications required within the unified metadata file.

6. The system according to claim 1, wherein the programming schedule defines a schedule of the linear media feed, ordering of the plurality of segments of the linear media feed during playout, and when to distribute the linear media feed.

7. The system according to claim 1, wherein the one or more processors are further configured transmit an electromagnetic signal corresponding to the unified package in one or more output formats to the plurality of distribution platforms.

8. The system according to claim 1, wherein the one or more processors are further configured to add a license window end and start in the unified metadata file.

9. The system according to claim 8, wherein the license window end and start is added in the unified metadata file to provide different data to each distribution platform of the plurality of distribution platforms based on date and timestamp structure.

10. A system, comprising:
    a memory for storing instructions;
    one or more processors in a distribution platform, the one or more processors are configured to execute the instructions, and based on the executed instructions, the one or more processors are configured to:
        receive a unified package from a broadcast provider system via a communication network, wherein the unified package comprises a plurality of segments of broadcast media feed with a plurality of triggers, and a unified metadata file,
            wherein the unified metadata file corresponds to a universal schema to share with a plurality of distribution platforms,
            wherein the unified metadata file comprises alternate license windows for enabling same asset and same metadata for a replacement of a first asset with a second asset,
            wherein the unified metadata file further comprises a plurality of category nodes with associated attributes for each of a respective distribution platform of the plurality of distribution platforms, and
            wherein the associated attributes are included in the unified metadata file based on at least a programming schedule of the broadcast media feed and an asset distribution interface (ADI) specification required by each of the plurality of distribution platforms;
        identify the plurality of segments of the broadcast media feed with the plurality of triggers and the unified metadata file from the received unified package;
        parse the universal schema of the plurality of category nodes with the associated attributes in the unified metadata file based on at least the ADI specification required by the distribution platform;
        correlate the plurality of segments of the broadcast media feed associated with the plurality of triggers and the parsed universal schema of the plurality of category nodes and attributes in the unified metadata file in accordance with at least the programming schedule of the broadcast media feed and the ADI specification required by the distribution platform;

transcode the plurality of segments of the broadcast media feed to a transport stream; and transmit a transport stream package that includes at least the transport stream to one or more subscribed consumer devices through the communication network.

11. The system according to claim 10, wherein the one or more processors are further configured to include one or more watermarks in the transport stream.

12. The system according to claim 11, wherein the one or more processors are further configured to store the transport stream that includes the one or more watermarks with corresponding metadata, wherein the corresponding metadata is a subset of the unified metadata file based on the ADI specification required by the distribution platform.

13. The system according to claim 12, wherein the one or more processors are further configured to generate the transport stream package in based on the ADI specification required by the distribution platform, wherein the transport stream package further includes the one or more watermarks.

14. A method, comprising:
determining, by one or more processors, a plurality of segments of a linear media feed based on one or more inbound triggers associated with the linear media feed;
generating, by the one or more processors, a unified metadata file that corresponds to a universal schema to share with a plurality of distribution platforms,
wherein the generated unified metadata file comprises a plurality of category nodes with associated attributes for each distribution platform of the plurality of distribution platforms, and
wherein the associated attributes are included in the unified metadata file based on at least a programming schedule of the linear media feed and an asset distribution interface (ADI) specification required by each of the plurality of distribution platforms;
inserting, by the one or more processors, alternate license windows in the unified metadata file for enabling same asset and same metadata for a replacement of a first asset with a second asset;
generating, by the one or more processors, a unified package comprising the plurality of segments of the linear media feed as a broadcast media feed and the generated unified metadata file; and
transmitting, by the one or more processors, the generated unified package to each distribution platform of the plurality of distribution platforms via a communication network.

15. The method according to claim 14, wherein the unified metadata file includes at least one of a media item identifier of the linear media feed, a title of the linear media feed, a short summary of the plurality of segments, a file format, encryption information, length of the linear media feed, a date and/or time the linear media feed was added to a catalog of media items, a new item indicator for the linear media feed, a media item class, a sequence of a plurality of attributes defined with respect to a corresponding node of the plurality of category nodes, and program-specific information (PSI) data, and closed captioning data.

16. The method according to claim 14, further comprising one or more of the plurality of distribution platforms that re-package the plurality of segments of the linear media feed and the unified metadata file based on one or more modifications required within the unified metadata file.

17. The method according to claim 14, wherein the programming schedule defines a schedule of the linear media feed, ordering of the plurality of segments of the linear media feed during playout, and when to distribute the linear media feed.

18. A method, comprising:
receiving, by one or more processors in a distribution platform, a unified package from a broadcast provider system via a communication network,
wherein the unified package comprises a plurality of segments of broadcast media feed with a plurality of triggers, and a unified metadata file,
wherein the unified metadata file corresponds to a universal schema to share with a plurality of distribution platforms,
wherein the unified metadata file comprises alternate license windows for enabling same asset and same metadata for a replacement of a first asset with a second asset,
wherein the unified metadata file further comprises a plurality of category nodes with associated attributes for each of a respective distribution platform of the plurality of distribution platforms, and
wherein the associated attributes are included in the unified metadata file based on at least a programming schedule of the broadcast media feed and an asset distribution interface (ADI) specification required by each of the plurality of distribution platforms;
identifying, by the one or more processors, the plurality of segments of the broadcast media feed with the plurality of triggers and the unified metadata file from the received unified package;
parsing, by the one or more processors, the universal schema of the plurality of category nodes with the associated attributes in the unified metadata file based on at least the ADI specification required by the distribution platform;
correlating, by the one or more processors, the plurality of segments of the broadcast media feed associated with the plurality of triggers and the parsed universal schema of the plurality of category nodes and attributes in the unified metadata file in accordance with at least the programming schedule of the broadcast media feed and the ADI specification required by the distribution platform;
transcoding, by the one or more processors, the plurality of segments of the broadcast media feed to a transport stream; and
transmitting, by the one or more processors, a transport stream package that includes at least the transport stream to one or more subscribed consumer devices through the communication network.

19. The method according to claim 18, further comprising including, by the one or more processors, one or more watermarks in the transport stream.

20. The method according to claim 19, further comprising storing, by the one or more processors, the transport stream that includes the one or more watermarks with corresponding metadata, wherein the corresponding metadata is a subset of the unified metadata file based on the ADI specification required by the distribution platform.

21. The method according to claim 20, further comprising generating, by the one or more processors, the transport stream package in based on the ADI specification required by the distribution platform, wherein the transport stream package further includes the one or more watermarks.

22. A non-transitory computer-readable medium having stored thereon, computer implemented instruction that when executed by a processor in a computer, causes the computer to execute operations, the operations comprising:
- determining, at a broadcast provider system, a plurality of segments of a linear media feed based on one or more inbound triggers associated with the linear media feed;
- generating a unified metadata file that corresponds to a universal schema to share with a plurality of distribution platforms,
  - wherein the generated unified metadata file comprises a plurality of category nodes with associated attributes for each of the plurality of distribution platforms, and
  - wherein the associated attributes are included in the unified metadata file based on at least a programming schedule of the linear media feed and an asset distribution interface (ADI) specification required by each of the plurality of distribution platforms;
- inserting alternate license windows in the unified metadata file for enabling same asset and same metadata for a replacement of a first asset with a second asset;
- generating a unified package comprising the plurality of segments of the linear media feed as a broadcast media feed and the generated unified metadata file; and
- transmitting the generated unified package to each distribution platform of the plurality of distribution platforms via a communication network.

23. A non-transitory computer-readable medium having stored thereon, computer implemented instruction that when executed by a processor in a computer, causes the computer to execute operations, the operations comprising:
- receiving, at distribution platform, a unified package from a broadcast provider system via a communication network,
  - wherein the unified package comprises a plurality of segments of broadcast media feed with a plurality of triggers, and a unified metadata file,
  - wherein the unified metadata file corresponds to a universal schema to share with a plurality of distribution platforms,
  - wherein the unified metadata file comprises alternate license windows for enabling same asset and same metadata for a replacement of a first asset with a second asset,
  - wherein the unified metadata file further comprises a plurality of category nodes with associated attributes for each of a respective distribution platform of the plurality of distribution platforms, and
  - wherein the associated attributes are included in the unified metadata file based on at least a programming schedule of the broadcast media feed and an asset distribution interface (ADI) specification required by each of the plurality of distribution platforms;
- identifying the plurality of segments of the broadcast media feed with the plurality of triggers and the unified metadata file from the received unified package;
- parsing universal schema of the plurality of category nodes with the associated attributes in the unified metadata file based on at least the ADI specification required by the distribution platform;
- correlating the plurality of segments of the broadcast media feed associated with the plurality of triggers and the parsed universal schema of the plurality of category nodes and attributes in the unified metadata file in accordance with at least the programming schedule of the broadcast media feed and the ADI specification required by the distribution platform;
- transcoding the plurality of segments of the broadcast media feed to a transport stream; and
- transmitting a transport stream package that includes at least the transport stream to one or more subscribed consumer devices through the communication network.

* * * * *